AUTOMATIC TELEPHONE AND LIKE EXCHANGE SYSTEMS

Filed June 14, 1957 8 Sheets-Sheet 1

Sept. 19, 1961 R. W. S. KINSEY 3,001,028

AUTOMATIC TELEPHONE AND LIKE EXCHANGE SYSTEMS

Filed June 14, 1957 8 Sheets-Sheet 3

Sept. 19, 1961 R. W. S. KINSEY 3,001,028

AUTOMATIC TELEPHONE AND LIKE EXCHANGE SYSTEMS

Filed June 14, 1957

8 Sheets-Sheet 4

Sept. 19, 1961 R. W. S. KINSEY 3,001,028

AUTOMATIC TELEPHONE AND LIKE EXCHANGE SYSTEMS

Filed June 14, 1957

8 Sheets-Sheet 6

Sept. 19, 1961 R. W. S. KINSEY 3,001,028

AUTOMATIC TELEPHONE AND LIKE EXCHANGE SYSTEMS

Filed June 14, 1957 8 Sheets-Sheet 7

Sept. 19, 1961 R. W. S. KINSEY 3,001,028

AUTOMATIC TELEPHONE AND LIKE EXCHANGE SYSTEMS

Filed June 14, 1957

8 Sheets-Sheet 8

United States Patent Office 3,001,028

Patented Sept. 19, 1961

3,001,028

AUTOMATIC TELEPHONE AND LIKE EXCHANGE SYSTEMS

Ronald William Stanley Kinsey, West Dulwich, London, England, assignor, by mesne assignments, to Siemens Edison Swan Limited, London, England, a British company Filed June 14, 1957, Ser. No. 665,774

Claims priority, application Great Britain June 14, 1956

10 Claims. (Cl. 179—18)

This invention relates to automatic telephone and like selective switching systems of a nature permitting a connection, or "call," to be established between a calling station requesting such connection and a called station connected to the system. It has an important application in and will be described with particular reference to semi-electronic systems employing electro-mechanical selector switches of a cross-bar or other equivalent type controlled by devices of an electronic nature such as thermionic or cold-cathode valves or transistors. It is to be understood, however, that the invention is also applicable to fully electronic systems, in which for example the switches are constituted by electronic devices such as cold-cathode valves or transistors, and to other systems employing for instance motor uniselector switches.

Before describing the invention and embodiments thereof, it is thought desirable to indicate in general terms the significance of various words as they will be employed hereinafter.

The term switch will be used to denote an arrangement of switching devices (cross-bar, electronic or other) affording selective access between a number of terminal groups on one side of the switch and the same or a different number of terminal groups on the other side, the terminals constituting each group permitting connection to the switch of, for instance, respective wires of a particular trunk extending between a stage including the switch and another switching stage. For instance in a cross-bar exchange, each switch may comprise one or more cross-bar switch units as will be further discussed later.

A cross-bar switch unit, an example of which is described for instance in volume 2, at pages 639–640, of the text book "Telephony," by J. Atkinson, essentially consists in its usual form of an assembly of contact sets (each comprising a number of co-operating moving and fixed contacts) which are arranged matrix-wise in a number of horizontal and vertical rows, of which there are usually ten horizontal rows and ten or twenty vertical rows. These contact sets are selectively actuable by the operation of electromagnets provided one for each vertical row ("hold" magnets) and one for each horizontal row ("select" magnets), the operation of a select magnet and a hold magnet, in that order, causing operation of a horizontal selecting member and vertical holding member which together are effective to actuate the contact set at the "cross-point" of the horizontal and vertical rows to which the operated magnets respectively pertain. Contacts corresponding to each other in the several sets in each vertical row, one contact from each co-operating pair, are electrically interconnected to constitute a multi-path vertical multiple providing a number of separate paths equal to the number of contact pairs per set, while of the remaining contacts corresponding contacts from the several sets in each horizontal row are also electrically interconnected to constitute a multi-path horizontal multiple. The arrangement thus provides that any one of a number of terminal groups (for example, ten or twenty) connected respectively to the multi-path vertical multiples can be given access to any one of a number of terminal groups (for example, ten) connected respectively to the horizontal multiples, it being appreciated that the terminals of each group are connected respectively to the several paths afforded by the multiple to which the group as a whole is connected.

As previously indicated, a number of cross-bar switch units may be employed in conjunction so as to constitute a switch affording access through the switch from or to a different number of terminal groups on either side of the switch: for instance ten cross-bar units having ten vertical contact rows each, or five cross-bar units having twenty vertical rows each, providing a hundred vertical multiples in either case, may have their horizontal selecting bars arranged to operate together and the horizontal multiplying continued through all the units to provide a composite switch through which each of a hundred terminal groups connected to the vertical multiples has access to ten terminal groups connected to the horizontal multiples. The term "frame" will be used to denote an assembly of switches together providing access through the frame from or to a still greater number of terminal groups on one or both sides of the frame: for instance a frame may comprise ten switches on its primary side, each comprising ten horizontally multipled cross-bar units, and ten switches on its secondary side each comprising a single cross-bar unit, the horizontal multiples of the primary and secondary switches being cross-linked so as, assuming ten vertical multiples per cross-bar unit, to give access between a thousand trunks connected to the vertical multiples of the primary switches by way of the respective terminal groups and a hundred trunks likewise connected to the vertical multiples of the secondary switches.

For convenience in terminology, the term trunk as used herein will denote the interconnection between a terminal group of a switch in one switching stage and a terminal group of a switch in another switching stage, while the term link will be used to denote the interconnection between terminal groups of respective switches in one and the same stage or frame. It will be appreciated that each such interconnection will usually include a number of wires corresponding for instance to the usual so-called (+), (−) and P wires in a telephone exchange system.

It is sometimes required in an automatic telephone exchange or other switching system to transmit from one point or stage to another, distinctive signals indicative of different connections that have been or are to be effected between these points or stages for the establishment of a call initiated by a calling station connected to the system. For instance, to go from the general case to a more particular example, on initiation of a call by a subscriber connected to an automatic telephone exchange employing cross-bar or motor-uniselector switching, a signal indicative of which subscriber is calling and obtained as a result of the subscriber looping his line circuit is often required to be transmitted forward for controlling, though not necessarily itself effecting, the operation of various switching stages. Somewhat similarly, when a subscriber connected to the exchange is being called a signal indicative of the subscriber concerned is required and may be provided by a common marker which backward marks in the exchange, namely from the called subscriber's end, all the free paths through the exchange to that subscriber, the markings (that is, distinctive potentials imparted to wires pertaining to the individual paths) being extended over a number of switching stages to a register (sender) or other control point where one of the free paths is selected and from which a setting signal controlling the setting up of connections to establish a circuit over the selected available path is reverted towards the subscriber's end.

A signal identifying a calling or called subscriber could be transmitted by marking a signal wire individual to the particular subscriber. However the total number of signal wires required for this purpose, being equal to the number of subscribers connected to the exchange, might be very large; for instance a directory exchange may have up to 10,000 subscribers connected to it. To avoid the necessity for such a large number of signal wires, coded signals are often employed made up of pulses occurring at distinctive times (time division multiplex) or in trains of distinctive number; this, however, involves the provision of pulse supplies and of relatively complex circuitry and is liable to lead to severe reduction in the grade of service on failure of a section of the exchange. Moreover for an electronic or semi-electronic exchange the maximum practicable pulse repetition frequency which could be used for a time division multiplex system using cold-cathode tubes may be too slow to take full advantage of the speed of operation of the electronic circuits and may, moreover, be an audible frequency which could not be used for selecting subscribers' lines since it could not readily be attenuated to a suitable level.

It is therefore one object of the present invention to enable subscriber signalling (calling or called) to be effected over a number of signal wires significantly less than the number of subscribers, without recourse to coded pulse signalling.

In some automatic telephone exchange systems—for instance those described in our applications Nos. 434,008, now U.S. Patent 2,844,653, and 472,727, now U.S. Patent 2,890,286—it is also required to transmit between the control circuits for successive switching stages, signals indicative of which particular free trunk between such stages has been selected as that over which a through-connection between the calling and called subscribers will be established. Thus assuming for example that each switching stage includes ten frames each of which comprises ten primary switches interlinked with ten secondary switches and has a hundred trunks leading from it to the following stage, and assuming further that for full flexibility of the exchange any terminal group at one side of any frame is to be able to be interconnected to any terminal group at one side of any frame in the following stage, then 1000 trunks will be required between the frames in adjacent stages. Thus, in the process of establishing a connection through the exchange and upon the selection in one switching stage of one out of the possible 1000 trunks, it becomes necessary to pass to the next stage, as by marking an appropriate signal wire or wires, a signal indicating which is the selected trunk. Here again, if a signal wire were provided individual to each trunk, the total number of signal wires could be large, being 1000 for the example quoted. It is therefore a further object of the invention to enable the number of wires required for this latter signalling to be reduced.

According to the invention in an automatic telephone exchange or like selective switching system, transmission of distinctive signals relating respectively to a plurality of possible connections to a switching stage is effected by what will be termed a co-ordinate signalling system in which, in the general case, a unique and individual combination of N signal wires, taken one from each of N groups containing $M_1$, $M_2$ . . . $M_N$ wires respectively ($N$—2 or more), is allocated to each signal that may have to be transmitted, the product of the numbers of wires in the several groups ($M_1 \times M_2 \ldots \times M_N$) being at least equal to the total number of signals to be catered for and the transmission of a signal being effected by appropriate marking of the N co-ordinate wires pertinent to that particular signal. In this way, the total number of signal wires required can be less than the number of signals involved, the difference increasing rapidly as the number of signals to be catered for increases. It will be appreciated that $M_1$, $M_2$ . . . $M_N$ represent respective integers, greater than unity, which may or may not be equal.

In carrying out the invention it is envisaged that two- or three-, or possibly four-, co-ordinate signalling ($N$=2 or 3 or 4) may be employed as may appear most convenient for a particular application. Thus if, for examplate, a thousand subscribers were connected to the primary side of a primary frame having ten primary switches each comprising ten cross-bar units having in turn ten vertical multiples each, then three-co-ordinate subscriber signalling employing three groups of ten wires each could with advantage be used since the three co-ordinates for any particular subscriber, indicated by marking one wire from each group in a distinctive combination, could be respectively indicative of the particular switch to which that subscriber is connected in the frame, of the cross-bar unit to which the subscriber is connected in that switch, and of the vertical multiple to which the subscriber is connected in that unit: in this way the connections of the thousand subscribers to the frame can be distinctively indicated using only thirty signalling wires.

Three situations in which co-ordinate signalling in accordance with the invention can be employed, namely calling subscriber signalling, called subscriber signalling by a marker, and setting signalling for electronically controlled switching stages, have already been mentioned and the application of the invention in these situations will now be discussed in more detail with particular reference to a semi-electronic cross-bar telephone exchange system in some ways similar to that described in our application No. 472,727.

In the following, reference will be made to the accompanying drawings, in which:

FIG. 1 is a diagrammatic illustration of the cross-bar switches and their interconnections, constituting one primary frame of the exchange, there being a number of such frames all similar to that illustrated;

FIG. 2 is a trunking diagram in block schematic form showing only two primary frames together with incoming and outgoing secondary frames, an intermediate frame, a supervisory circuit, one of a number of registers, a common register selection circuit and a common marker, only one primary, one secondary, and one register section switch being indicated in each primary frame and only one primary and one secondary switch being indicated in all other frames;

It will be assumed that the trunking of the exchange to be considered is designed on the basis of 10,000 subscribers' lines being connected to it, this being the number to which exchanges are commonly limited in present day practice. Where a number of 10,000-line exchanges are linked together to form a directory area, each subscriber on an exchange is identified by a four-digit number preceded by a three-digit code identifying the exchange. The above assumption is justified however since the three-digit exchange code plays no part in setting up a call in the particular exchange selected by it. It will also be assumed that the loading of the exchange dictates that each 1000 subscribers should have access through a primary frame to 100 internal exchange trunks, thus requiring a primary switching stage having ten frames in all: for a higher calling rate the number of subscribers per primary frame would be reduced to give, say, each 500 subscribers access to 100 internal trunks, requiring a corresponding increase in the number of frames to twenty.

Figure 1:
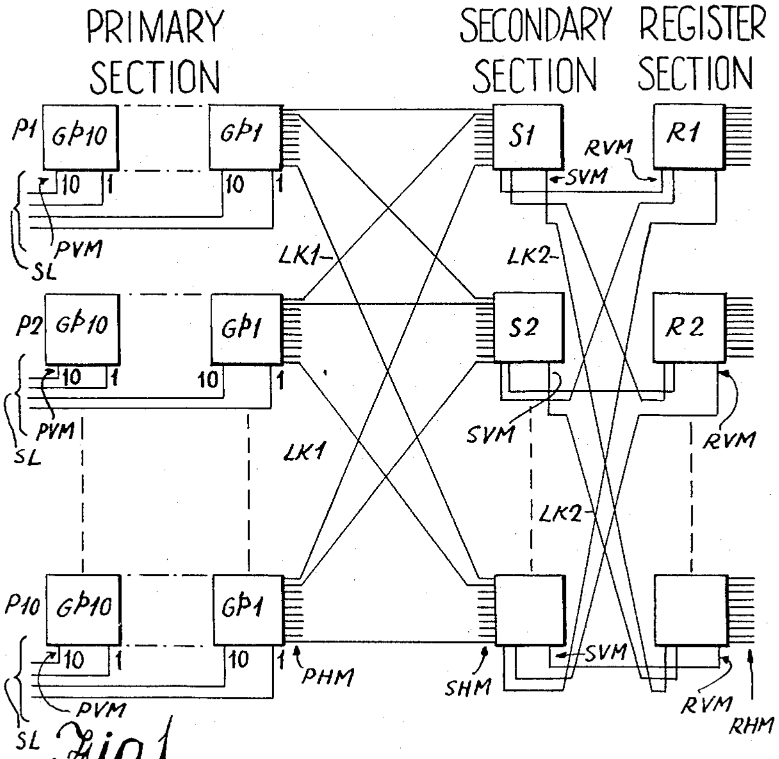

On the above basis, each of the ten frames in the primary switching stage includes, as indicated diagrammatically in FIG. 1, ten primary-side switches P1, P2 . . . P10, each made up either of ten horizontally coupled cross-bar units each having ten vertical multiples constituting a single group or of five horizontally coupled cross-bar units each having twenty vertical multiples effectively divided into two groups of ten, the 1000 subscribers' lines SL on the frame being connected to the 1000 vertical multiples PVM thus provided in ten groups G*p*1 . . . G*p*10 per switch, only the first (1) and tenth (10) vertical multiple in each group having been indicated in FIG. 1 for the sake of clarity. The ten horizontal multiples PHM of each primary-side switch P1 . . . P10 are cross-linked as indicated at LK1 with the horizontal multiples SHM of ten secondary-side switches S1 . . . S10 each consisting of a single cross-bar unit having ten vertical multiples SVM connected to respective link or trunk connections LK2 (100 in all) on the secondary sides of the frame, the link arrangement LK1 being such that each primary-side switch P1 . . . P10 has a link to each secondary-side switch S1 . . . S10, and each of the 1000 subscribers' lines SL has therefore access through the switches to the 100 secondary-side connections LK2.

The several primary frames in the exchange have associated with them respective register switching sections RS of which each comprises the same number of switches R1 . . . R10 as there are secondary switches S1 . . . S10 in each primary frame and in which each switch R1 . . . R10 is constituted by a cross-bar unit having ten vertical multiples RVM. These register sections are preferably included in the respective primary frames and are assumed to be so included in FIG. 1 (which relates to a single frame) and in the ensuing description, so that the connections LK2 are links in the meaning of the term herein; with appropriate modification of the overall switching arrangement in the exchange, however, the register sections could together constitute a separate switching stage (register frame) as in our application No. 472,727, and the connections LK2 would then be trunks. The switches R1 . . . R10 of each register section have their vertical multiples RVM cross-connected with the vertical multiples SVM of the secondary switches S1 . . . S10 of the associated primary frame, in such manner that each register section switch has a link LK2 from it to each primary frame secondary switch.

The exchange also includes a plurality of registers (not indicated in FIG. 1) to which the register sections associated with the several primary frames have common access from the horizontal multiples RVM of their switches, R1 . . . R10, and also a common register selection circuit RC (FIG. 2).

Figure 2:
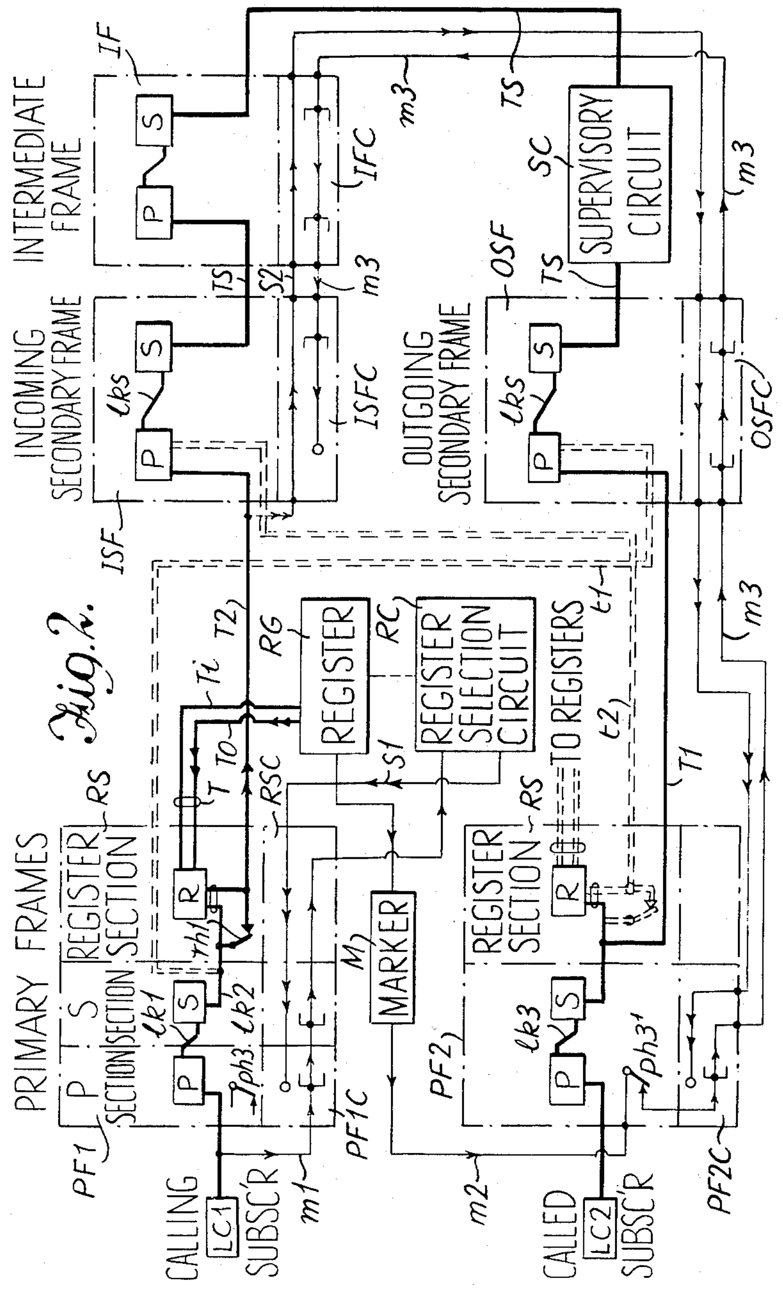

Referring now to FIG. 2 the exchange includes, in addition to the equipment already mentioned, a common marker M, incoming and outgoing secondary switching stages, supervisory circuits such as SC, and one or more intermediate switching stages. The secondary stages and the or each intermediate stage are each composed of an appropriate number of frames such as ISF, OSF and IF, each of which comprises ten primary switches such as P and ten secondary switches such as S constituted by respective cross-bar units having ten vertical multiples each, the primary and secondary switches P and S of each frame being cross-linked on their horizontal multiples as indicated at *lks* to give a hundred trunks on one side of the frame access to a hundred trunks on the other side. For the sake of clarity only one frame in each of the secondary stages and the intermediate stage has been shown in FIG. 2 and only one primary switch P and one secondary switch S in each of these frames. Likewise only one primary switch P, one secondary switch S and one register section switch R have been shown in each of two primary frames PF1 and PF2 to which it has been assumed that a calling and called subscriber as represented by their line circuits LC1 and LC2 are respectively connected. It will be appreciated of course that a calling and called subscriber may be connected to the same primary frame and even to the same primary switch in the frame, or that the calling subscriber may be on another exchange with his line circuit effectively extended over a junction from that exchange. Only one of the registers, of which there may be up to 100, is shown at RG. Also for the sake of clarity, FIG. 2 includes only those trunks and links which are actually involved in the setting up and final connection of a call between the two subscribers, these trunks and links being shown in heavy lines while corresponding signalling connections are shown in lighter lines. Similar trunking would be involved for any other calling or called subscriber and this has been indicated by the inclusion in dotted lines of trunking *t*1 and *t*2 which would be involved if LC2 represented the calling subscriber's line circuit and LC1 the called subscriber's line circuit (instead of vice versa).

The trunks and links shown in single heavy lines would include the usual (+), (−) and private or "P" wires and each cross-point contact set in the crossbar switches to which they are connected would accordingly include at least three pairs of co-operating contacts, that is, one per wire. On the vertical multiple side of each register section, however, and also between the horizontal multiple side of each register section and the register RG as selected by the register selection circuit RC, two sets of wires, each including a (+), (−) and P wire, are required as will appear hereinafter. To represent this, the trunks at these places have been represented by two adjacent thick lines embraced by a loop. In addition to their connection to the register section switches R over links such as *lk*2 corresponding to the links LK2 in FIG. 1, the secondary switches S in each primary frame such as PF1 and PF2 are also connected, both to the primary side of the primary switches in an outgoing secondary frame such as OSF, this connection being made over trunks such as T1 and *t*1, and to the primary side of the primary switches in an incoming secondary frame such as ISF, the connection to the incoming frame switches being made by way of trunks such as T2 and *t*2 through auxiliary contacts such as *rh*1 which are provided in the register section switches R in respect of each vertical multiple in the latter and are actuated when the hold magnet relevant to such vertical multiple is operated.

Each frame in the exchange has its own electronic control circuit which functions to select an available route through the frame (namely by way of a primary and a secondary switch and a link between these switches), to record information concerning the selected route, and to set the relevant switches to establish that route. The control circuits for the frames PF1, PF2, ISF, IF and OSF have been indicated by the appended chain-dotted blocks PF1C, PF2C, ISFC, IFC and OSFC respectively and since they form no part of the present invention will not be described other than by reference to their function, any detailed description being thought to be superfluous to the present purpose. Each register section RS also has its own electronic control circuit RSC, functioning to select and record information concerning an available route through the section, which control circuit RSC may be effectively amalgamated with that of the associated primary frame as will appear hereinafter.

Subscriber signalling (calling or called) to the control circuits for the primary frames is conveniently effected on a frame basis, that is a separate signalling system is employed for each thousand subscribers connected to one frame. Moreover, since a thousand subscribers ($10^3$) are involved and there are ten cross-bar vertical multiples PVM in each group, ten groups (G*p*1 . . . G*p*10) in each primary switch and ten such switches (P1 . . . P10) in each frame, signalling to each primary frame control circuit is preferably effected on a three-decade-co-ordinate basis employing three sets of ten signalling wires each, this giving the required signalling facility without redundancy. A four-co-ordinate system could have been used but the consequent reduction in the required number of signalling wires would have tended to be outweighed by the complications and expense of the splitting and recombination of the co-ordinate signals which would then have been required.

Separate co-ordinate signalling is employed for calling subscriber signalling and for called subscriber signalling by a marker. The three sets of ten signalling wires employed for calling subscriber signalling will be termed the X, Y and Z co-ordinate sets and those for called subscriber signalling the X′, Y′ and Z′ co-ordinate sets. In the X and X′ co-ordinate sets each wire relates to a particular primary switch P1 . . . P10 of the primary frame. In the Y and Y′ co-ordinate sets each wire relates to a particular group of vertical multiples in any switch; that is, one wire relates to the groups G*p*1 in the several switches, another to the groups G*p*2 and so on. In the Z and Z′ co-ordinate sets each wire relates to the position of a particular vertical multiple PVM in any group in any switch; that is, if the vertical multiples are considered as being numbered 1–10 (see FIG. 1) in each group, one wire of the Z co-ordinate set relates to the vertical multiples numbered 1, another to the vertical multiples numbered 2 and so on.

Figure 3:
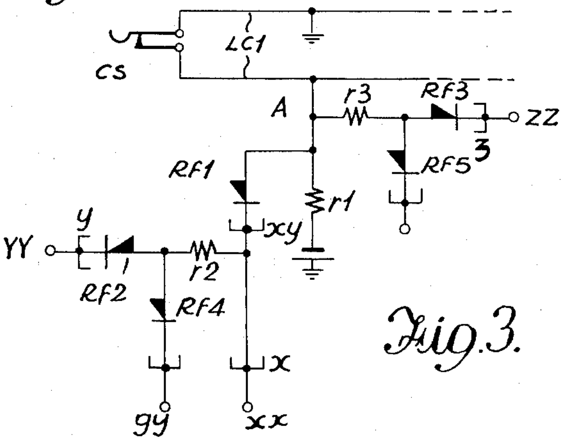
FIG. 3 illustrates for a single subscriber the basic considerations involved in obtaining a three-co-ordinate signal identifying that subscriber when calling.

Referring to FIG. 3, a calling subscriber initiates a call by looping his line circuit LC1 at his receiver rest CS. This causes a point A individual to that subscriber to be marked either by the operation of a relay having its coil in the line circuit or, as shown, by the development of a voltage across a resistor *r*1 in the line circuit, the latter method being more simple and preferred. The potential of this marked point A is applied, through circuits providing isolation and gating for the purposes indicated below, to mark the particular X co-ordinate wire XX, Y co-ordinate wire YY and Z co-ordinate wire ZZ which relate respectively to the switch, the group and the position in that group at which that particular subscriber is connected, the combination of three wires thus marked being unique to the subscriber. The X co-ordinate wire XX thus marked is commoned, as indicated by the square bracket *x* applied thereto, to the corresponding wires in the marking circuits for other subscribers connected to the same switch in the frame. Likewise the Y co-ordinate wire YY is commoned at *y* to those relating to other subscribers connected to corresponding groups in the several switches, while the Z co-ordinate wire ZZ is commoned at *z* to those relating to other subscribers connected to corresponding positions in the several groups. The part of circuit concerned with marking the X and Y co-ordinate wires is commoned at *xy* to the parts relating to the marking of the Z co-ordinate wires for subscribers connected to the same group and thus having the same X and Y co-ordinates.

The isolation referred to, provided by rectifiers R*f*1, R*f*2 and R*f*3, is necessary to ensure that the marking of any one co-ordinate wire by a subscriber cannot result, by a feedback action, in the marking of other co-ordinate wires pertaining to other subscribers to which the first-mentioned co-ordinate wire also relates, which latter marking would give a possibly false indication that such other subscriber was calling. The gating, which is provided by circuits involving the rectifier R*f*2 in conjunction with rectifier R*f*4 and resistance *r*2 and rectifier R*f*3 in conjunction with rectifier R*f*5 and resistance *r*3, is introduced between each subscriber's line and the co-ordinate signalling wires, such as XX, YY and ZZ, in order to avoid ambiguity in the signal given to the primary frame control circuit when a number of subscribers are calling at the same time. In this connection it will be appreciated that if, say, the subscriber to which the X1, Y2 and Z3 co-ordinate wires together uniquely relate was calling at the same time as the subscriber to which the X8, Y9 and Z10 coordinate wires relate, ambiguity would result if the subscribers were allowed to mark all the relevant co-ordinate wires at the same time since the combined marking could equally but falsely indicate, for instance, that the subscriber to which the X1, Y9, Z3 co-ordinate wires relate, or that to which the X8, Y2, Z3 wires relate was also calling. It is therefore arranged, as will become clearer as the description of the working of the exchange proceeds, that when a subscriber initiates a call the relevant Y and Z co-ordinate wires are not marked contemporaneously with each other but are marked in turn, in the order given, and then only if, in the case of the Y co-ordinate, the control circuit has previously selected the related X co-ordinate, and if in the case of the Z co-ordinate the control circuit has already selected the related X and Y co-ordinates. Gating signals for the Y co-ordinates are applied at terminal *gy* common to all subscribers having the same X co-ordinate (that is, to all subscribers connected to a particular switch), while gating signals for the Z co-ordinate are applied at terminal *gz* common to all subscribers having the same X and Y co-ordinates, that is, to all subscribers connected to a particular group.

Figure 4:
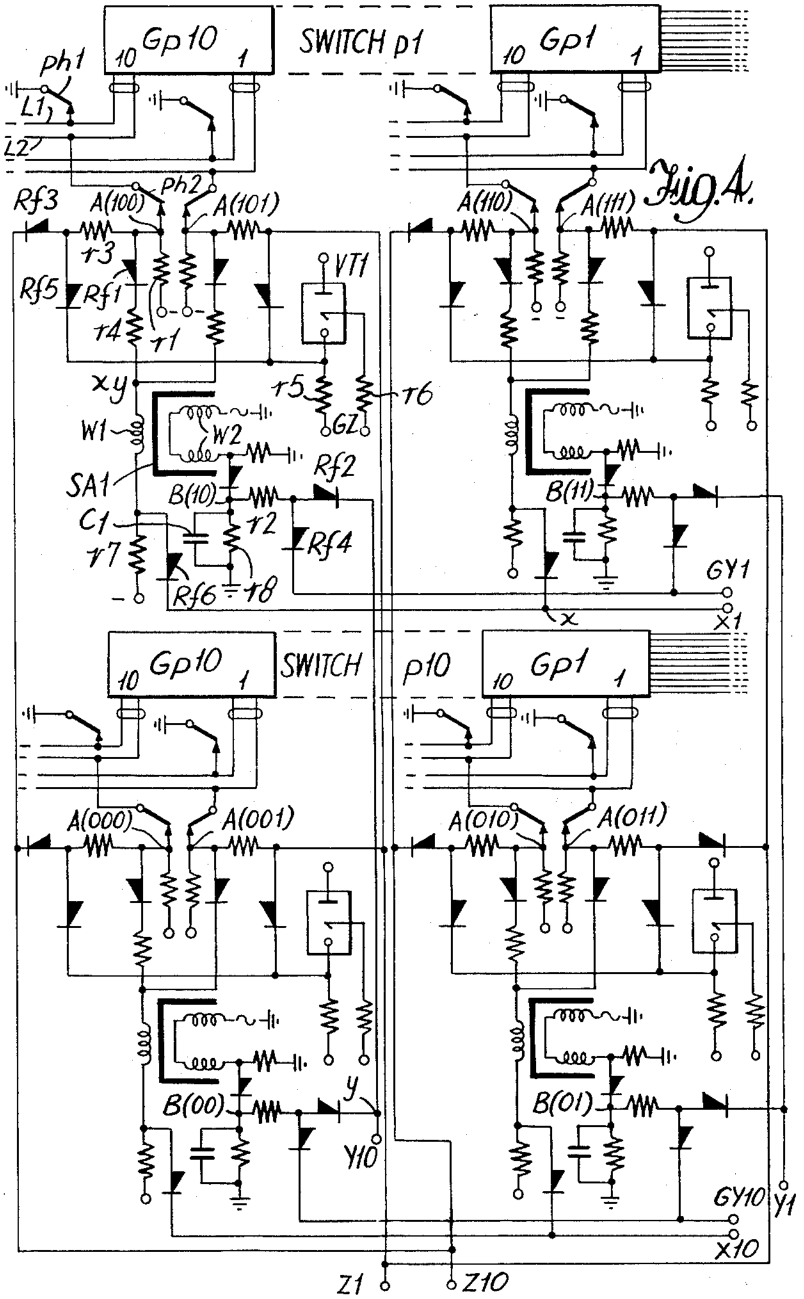
FIG. 4 is an abbreviated circuit diagram, for a number of subscribers' lines, of a practical co-ordinate signalling circuit based on FIG. 3.

A practical circuit for calling subscriber co-ordinate signalling to the primary frame is shown in FIG. 4, which relates to a single frame and in which for the sake of clarity only two primary switches, P1 and P10, only two groups, G1 and G10 in each switch, and only two positions, 1 and 10 in each group, have been considered, the circuit details for these being identical for the remainder. For brevity and ease of description, the circuit of FIG. 4 will be described with specific reference only to those circuit details which relate to a single subscriber, namely the one connected to position 10 in group G*p*10 in switch P1, the rest being similar as will be apparent from the symmetry of the circuit diagram. Moreover, the references employed in FIG. 3 will be used again for corresponding elements in FIG. 4.

Referring to FIG. 4 each subscriber's line circuit includes a pair of line wires such as L1 and L2 connected at one end to the subscriber's receiver rest (as indicated in FIG. 3 but not shown in FIG. 4), and connected at the other end to a vertical multiple in one of the primary frame primary switches, the particular subscriber considered being connected to the vertical multiple numbered 10 in the group G*p*10 of the switch P1. On initiation of a call by looping of a line circuit, a point such as A(100), individual to the calling subscriber, is marked by the establishment between earth and a source of negative potential of a connection extending through resistance *r*1 and including auxiliary contacts such as *ph*1 and *ph*2 associated with the vertical multiple to which the subscriber is connected. The purpose of these auxiliary contacts, which are opened when the hold magnet for the pertinent multiple is energized, will be explained later.

The individual points A relating to subscribers connected to correspondingly positioned vertical multiples are commoned together through resistances such as *r*3 and isolating rectifiers such as Rf3 to a Z co-ordinate wire pertaining to that position; thus points such as A(100), A(110), A(000) and A(010) are commoned in this way to the Z10 co-ordinate wire (so marked), while points such as A(101), A(111), A(001) and A(011) are likewise commoned to the Z1 co-ordinate wire. Consequently when the subscriber being considered is calling the resultant marking at point A(100) is extended toward the Z10 co-ordinate wire. The junction points of the resistances and rectifiers such as r3 and Rf3 relating to subscribers in one and the same group are commoned through isolating rectifiers such as Rf5 to the cathode of a three-electrode discharge tube such as VT1, there being therefore a hundred such tubes, one per group. Each of these tubes has a cathode resistance such as r5, and also a trigger resistance such as r6 which is connected between its trigger electrode and a terminal such as GZ to which, as will appear hereinafter, a gating signal will be applied to fire the tube only when the X and Y co-ordinates of the relevant group have been selected. By way of example, if the point A(100) has been marked but the tube VT1 has not been fired, the rectifier Rf5 will conduct and divert the marking from the co-ordinate wire Z10, marking of this wire from the point A(100) taking place only when the tube VT1 has been fired and its cathode potential backs off the rectifier Rf5.

The points such as A(100) and A(101) relating to subscribers connected to the same group are commoned to a point such as xy through respective isolating rectifiers such as Rf1 and resistances such as r4. The common points such as xy so formed are connected to the control winding W1 of an individual saturable reactor such as SA1, there being therefore a total of one hundred such saturable reactors for the frame. The control winding W1 of each of these saturable reactors is connected between the associated common point such as xy and a source of negative potential through a resistance such as r7. The junctions between the control winding and this latter resistance in the ten saturable reactors pertaining to respective groups in the same switch, are commoned together as at x, through isolating rectifiers such as Rf6, to the relevant X co-ordinate wire: thus the saturable reactors such as SA1 associated respectively with the ten groups in switch P1 have the junctions between their control windings and associated resistances connected in common to the X1 co-ordinate wire, and likewise the saturable reactors similarly associated with switch P10 have the corresponding junction points connected in common to the X10 co-ordinate wire. Consequently a marking at any of the A points will result in the corresponding X co-ordinate wire being also marked.

When a point such as A(100) is marked, the associated saturable reactor such as SA1 provides through its output windings such as W2 an output signal which, rectified in Rf7 and smoothed in C1, R8, marks a point such as B(10). The B points associated with the saturable reactors which respectively relate to corresponding groups from the several switches P1 . . . P10, are commoned through respective gates such as r2, Rf4 and isolating rectifiers such as Rf2 to the Y co-ordinate wire pertaining to these groups: thus the points such as B(10) and B(00) relating respectively to the groups Gp10 in the several switches are commoned in this way at y to the Y10 co-ordinate wire, while the points such as B(11) and B(01) relating to the Gp1 groups are likewise commoned to the Y1 co-ordinate wire. In respect of each switch, the gating rectifiers such as Rf4 associated therewith are commoned to a terminal, such as GY1 for switch P1 and GY10 for switch P10, to which as will appear hereinafter, a gating signal is applied only when the X co-ordinate of the relevant switch has been selected. Thus it is contemplated that each terminal such as GY1 or GY10 will normally be held at earth potential but on selection of the X co-ordinate of the relevant switch will be raised to back off the associated rectifiers such as Rf4 to which that terminal is commoned. For example, if the point B(10) has been marked but the X1 co-ordinate relating to switch P1 has not been selected, the terminal GY1 will be at earth potential and the marking will be diverted through the rectifier Rf4 so as not to appear on the Y10 co-ordinate wire; if however the X1 co-ordinate has been selected and the potential of the terminal GY1 consequently raised, the rectifier Rf4 will be backed off and the marking at point B(10) will appear on the Y10 co-ordinate wire.

To summarize the manner in which the circuit of FIG. 4 operates to mark the X, Y and Z co-ordinate wires identifying a calling subscriber, it will be assumed that the subscriber connected to the lines L1 and L2 is calling, this subscriber being connected to the vertical multiple having the tenth position in the group Gp10 in the primary frame primary switch P1 and having therefore the co-ordinates X1, Y10, Z10. When the lines L1 and L2 are looped by this subscriber initiating the calling condition, the potential at point A(100) is raised due to the flow of current through the line loop and resistor r1. This causes the rectifier Rf1 to conduct and the consequent current flow through r4, W1 and r7 raises the potential at the junction of these last two components and causes rectifier Rf6 to conduct, thereby extending to the X1 co-ordinate wire, via the common point x, a marking signal indicating that a subscriber connected to the switch P1 is calling. Due to the current flow in the control winding W1 of the saturable reactor SA1, the latter produces an output which raises the potential at point B(10) and causes current to flow via r2 and Rf4 to terminal GY1, held at this stage of the operation at a suitable potential (earth) to allow this latter current flow to take place. Consequently the potential at the junction of resistor r2 and rectifier Rf4 is clamped negatively and rectifier Rf6 is prevented from conducting and thereby extending the marking at point B(10) to the Y10 co-ordinate wire. Also at this stage of the operation the valve VT1 is non-conductive and its cathode is negative to the raised potential of point A(100), with the result that rectifier Rf5 conducts and the potential at the junction of Rf5 and resistor r3 is clamped negatively to prevent the rectifier Rf3 from conducting and thereby extending the marking at point A(100) to the Z10 co-ordinate wire.

Since subscribers connected to different switches may be calling at once, other X co-ordinate wires, in addition to the X1 wire, may be marked in a similar manner. One of the marked X co-ordinates, antd thus in effect one of the switches to which a calling subscriber is connected, will be selected by the action of a reverted setting signal as will be described later, this "selection" being accompanied by a raising of the potential of the GY terminal pertaining to the selected switch. Assuming the X1 co-ordinate (switch P1) has been selected the potential of terminal GY1 is raised to back off rectifier Rf4 and permit the marking at point B(10) to appear on the Y10 co-ordinate wire to indicate that there is a calling subscriber in group Gp10. Since the terminal GY1 is common to all groups Gp1 . . . Gp10 of switch P1, any other group also having a calling subscriber connected to it will have the corresponding Y co-ordinate wire likewise marked. One of the marked Y co-ordinates, and thus in effect one of the groups, is selected as will be described, and assuming that it is group Gp10 the selection will be accompanied by the application of a gating signal to terminal GZ pertaining to that group. This will fire tube VT1, resulting in its cathode potential rising to back off rectifier Rf1 and permit the marking at point A(100) to appear on the Z10 co-ordinate wire. If any other subscriber connected to the group Gp10 in switch P1 is also calling, the marking at the relevant A point is released to mark the corresponding Z co-ordinate wire, since the firing of VT1 backs off all the gating rectifiers provided in respect of that group similarly to Rf5.

One of these marked Z co-ordinates is selected similarly to the selection of a Y co-ordinate and assuming that it is the Z10 co-ordinate the calling subscriber originally considered has now been finally selected for attention.

Referring to FIG. 2, a calling condition having been initiated by the subscriber whose line circuit is indicated at LC1, the resultant marking on an X co-ordinate wire is extended as a marking signal to the common register selection circuit RC, indicating in the process what free links such as *lk*1 are available between the primary switch P to which the calling subscriber is connected and the several secondary switches S in the frame, and also what free links such as *lk*2 are available between those secondary switches and the register section switches R. This extension of the marking, represented in FIG. 2 by the marking connection *m*1 bearing single arrowheads and commons *c*1 and *c*2, can be effected as by the upper circuit illustrated in the upper part of FIG. 5.

Figure 5:
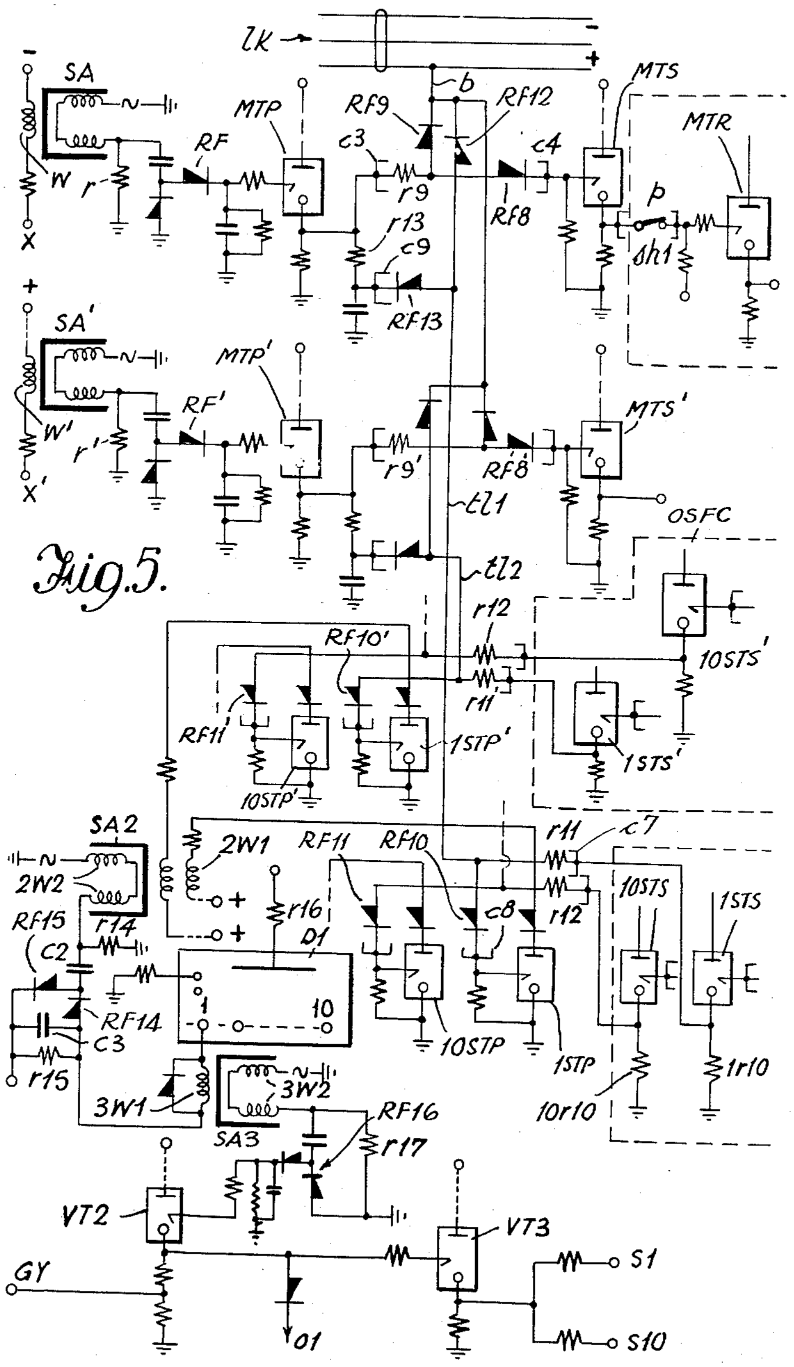
FIG. 5 is an abbreviated circuit diagram of part of a primary frame control circuit, the upper portion of the figure illustrating the manner of extending a marking forward from a calling subscriber and backward from a common marker to signal a called subscriber, while the lower portion illustrates a "one-only" selection circuit for selecting a marked X co-ordinate.

Referring to FIG. 5, an X co-ordinate marking initiated by a calling subscriber and appearing on the relevant X co-ordinate wire in FIG. 4, is applied over a wire such as X to excite the control winding W of a saturable reactor such as SA, causing the latter to produce an output which, appearing across resistor *r* and rectified in a voltage doubling circuit RF, fires a cold-cathode tube such as MTP individual to that co-ordinate and therefore to the primary switch to which the calling subscriber is connected, there being therefore ten such tubes, one per primary switch in the frame, of which only MTP has been shown in order to keep the drawing as simple as possible. The consequent rise in potential at the cathode of the fired tube MTP is applied via the common *c*3 as a marking to ten paths each comprising a resistor such as *r*9 and rectifier such as R*f*8 and leading to the trigger electrode of a cold-cathode tube such as MTS, these paths corresponding to the links (such as *lk*1 in FIG. 2) between the primary switch concerned and the secondary switches in the frame. Since there are ten such links extending one to each secondary switch (see FIG. 1), there will be ten such paths and ten such tubes as MTS. Moreover since each secondary switch has links to it from all the primary switches in the frame, each tube such as MTS will have its control grid commoned as indicated at *c*4, through paths such as that provided by *r*9 and R*f*8, to the cathodes of all the valves such as MTP relating to the frame concerned. There are therefore a hundred such paths in all, corresponding one to each link LK1 (FIG. 1) between the primary and secondary switches of the frame: in FIG. 5 only the path including *r*9 and R*f*8 is shown, together with the link *lk* to which it relates, this link including as do the others, the usual (+), (−) and P wires as previously indicated. Assuming that a busy condition of the link is indicated, as is common, by its P wire being earthed (not shown) a connection *b* is taken from the P wire to the junction of *r*9 and R*f*8 through a rectifier R*f*9. If, then, the link *lk* is busy, the raised marking potential at the cathode of MTP will cause current flow to earth through resistor *r*9 and rectifier R*f*9, resulting in their junction point being brought below the firing potential of MTS by virtue of the voltage drop across *r*9. If however the link *lk* is not busy, a marking potential appearing at the cathode of MTP will result in MTS being fired thus indicating that the link is free. Similarly for the other links and the other valves and their associated paths between the tubes such as MTP and those such as MTS.

The secondary switches S, to each of which one of the tubes such as MTS will individually relate, are cross-linked to the register section switches R by the links LK2 (FIG. 1) between their vertical multiples. Firing of a tube such as MTS results in its cathode potential being raised to mark, via the common *c*5, each of ten paths such as *p* relating respectively to the links LK2 extending to the register section switches from the secondary switch to which the fired tube such as MTS relates. The ten paths *p* from the cathode of each of the tubes such as MTS lead to the trigger electrodes of respective cold-cathode tubes such as MTR provided individually for the several register section switches, and since each register section switch has links LK2 to it from all the secondary switches in the frame the trigger electrode of each tube such as MTR is commoned as indicated at *c*6, over paths such as *p*, to the cathodes of all the secondary switch tubes such as MTS. There will therefore be a hundred such paths each of which will individually relate to a particular one of the hundred links (LK2) between the secondary switches S and the register section switches R in the frame. A busy condition of any one of these latter links implies that the hold magnet for the vertical multiple to which it is connected in a secondary switch (and also the hold magnet for the vertical multiple to which it is connected in a register section switch) is in an energised condition. Consequently such busy condition can be detected by means of auxiliary contacts such as *sh*1 opened when the relevant secondary switch hold magnet is energised. These auxiliary contacts are therefore included in the respective paths such as *p* so that a marking at the cathode of a fired tube such as MTS will be extended to the tubes such as MTR over only those paths such as *p* which relate to free links between the secondary and register section switches. Any tube such as MTR receiving such marking will be fired thereby to produce at its cathode terminal such as O a marking which is passed from there to the register selection circuit. In this way, an X co-ordinate marking applied at terminal X will be extended to the register selection circuit through the circuit just described, indicating in the process, according to which tubes such as MTP are fired, which tubes such as MTS are fired, and which tubes such as MTR are fired, what links such as *lk*1 and *lk*2 (FIG. 2) are free.

The register selection circuit RC, in response to receipt of a marking signal initiated by the calling subscriber LC1, selects a free register RG (FIG. 2), busies it against further selection, and reverts to the register section control circuit RSC of the primary frame PF1 concerned, over a connection *s*1 bearing double arrowheads, a setting signal identifying the particular trunk (T) by which the selected register RG is connected to the register section of the frame. Since this trunk T1 is connected to a particular horizontal multiple in a particular register section switch in a particular primary frame, the setting signal can be sent to the primary frames on a co-ordinate basis as a marking on one of *n* wires relating to the respective frames assumed to be *n* in number, combined with a marking on one of ten wires relating to the respective register section switches of the frame, and a marking on one of ten wires relating to the respective horizontal multiples in each register section switch. A suitable co-ordinate signalling system for this purpose will be described later in connection with FIG. 9.

The register section control circuit RSC of the frame PF1, in response to a setting signal thus received, records the identity (secondary switch and horizontal multiple) of the marked trunk T (FIG. 2) by which the selected register RG is connected to the frame, then selects and records the identity of a link *lk*2 which extends to a secondary switch S from the register section switch concerned and has been indicated on being free as previously described. After recording the identity of the trunk T concerned the control circuit RSC also returns to the register selection circuit RC, in any convenient manner not shown, a signal which causes the circuit RC to release and become available for a further register selection while maintaining a busy condition on the already selected register.

Since the selected link *lk*2 extends to a particular secondary switch S in the primary frame, the link selecting action of the register section control circuit RSC is equivalent to selecting and recording the identity of that particular secondary switch. This selection and recording of the identity of the link *lk*2 and thus of a particular secondary switch S may be effected by a one-only selection and storage circuit similar to that denoted by ES3 in our said application No. 472,727. It will be assumed therefore that the identity of the secondary switch concerned is recorded by the firing of the relevant one of ten storage tubes provided individually in respect of the several secondary switches in the frame. These storage tubes are represented by the tubes 1STS and 10STS in the lower part of FIG. 5, only two of the ten tubes being shown in order to minimise complexity of the drawing. These tubes have respective cathode resistors 1*r*10 and 10*r*10, so that on one of the tubes being fired its cathode potential will be raised to a marking value.

It is now required to select a free link *lk*1 extending from the selected secondary switch S to a primary switch P having a calling subscriber connected to it: that is, if two or more subscribers connected to different primary switches are calling together, it is necessary to select one of these primary switches in (random) preference to the others, or, in other words, to select a particular marked X co-ordinate. To this end, referring to FIG. 5, the ten tubes such as 1STS and 10STS, relating respectively to the secondary switches S, are associated with ten other cold-cathode tubes relating respectively to the ten primary switches and represented in the lower part of FIG. 5 by the two tubes 1STP and 10STP. Each of the tubes such as 1STS and 10STS has its cathode connected to the trigger electrodes of all the ten tubes such as 1STP and 10STP via a common such as *c*7 and respective paths each including a resistor and rectifier such as *r*11 and R*f*10 or *r*12 and R*f*11; as indicated by the commons such as *c*8 the trigger electrode of each STP tube is also connected in common over such paths to the cathodes of all the associated STS tubes. The cathodes of the STS tubes are thus cross-coupled with the trigger electrodes of the STP tubes in the same way as already described in connection with the MTP and MTS tubes in the upper part of FIG. 5, there being a total of a hundred of said paths between them corresponding respectively to the hundred links such as *lk* between the primary and secondary switches of the frame. A testing lead such as *tl*1 is taken via a rectifier such as R*f*12 from the junction point of the rectifier and resistor such as *r*11 and R*f*10 in each path to the P wire in the link such as *lk* to which that path pertains. Each testing lead such as *tl*1 is also taken via a rectifier such as R*f*13 and a resistor such as *r*13 to the cathode of the MTP tube relating to the primary switch to which the link concerned is connected, each resistor such as *r*13 being common, as indicated at *c*9, to the test leads associated with those links which are connected to the same primary switch.

The firing of one of the STS tubes to identify the selection of a particular secondary switch, marks at its cathode the paths leading to each of the STR tubes, that is, the paths relating to the links between the selected secondary switch and the respective primary switches. The test lead such as *tl*1 associated with each of these marked paths tests whether the corresponding link such as *lk* is free and also whether the MTP tube which relates to the primary switch to which that link is connected, has been fired to indicate the presence of a calling subscriber connected to that switch. Considering the link *lk* and test lead *tl*1 as typical, if the link is busy (P wire earthed) the test lead is effectively earthed through rectifier R*f*12. Also, if the primary switch to which the link *lk* is connected has no calling subscriber on it, the tube MTP will be in an unfired condition, its cathode will be at earth potential, and the test lead *tl*1 will therefore be effectively earthed through rectifier R*f*13 and resistor *r*13. In either event the marking at the cathode of tube 1STS will be diverted to earth by way of the test link *tl*1, and will thereby be prevented from being applied to tube 1STP. If however the link *lk* is free and the tube MTP has been fired to indicate a calling subscriber on the related primary switch, the application of the marking from the cathode of tube 1STS to the tube 1STP is uninhibited (no earth being on the test link) and this latter tube therefore fires. Similar considerations apply in regard to the remaining paths from the cathode of the fired tube 1STS and to the other STP tubes.

As a result, those STP tubes are fired which relate to primary switches having calling subscribers connected thereto and free links extending to the selected secondary switch. The selection of one of these primary switches, that is the selection of a marked X co-ordinate, is then effected by the "one-only" selection circuit now to be described.

Still referring to FIG. 5, a one-only selection circuit comprises a known type of a multi-cathode (Dekatron) cold-cathode discharge tube D1 having ten cathodes 1 . . . 10 relating respectively to the ten primary switches (X co-ordinates), and an auxiliary "keep-alive" electrode *e* which is invested by a low intensity discharge in the tube when no discharge is investing any one of the cathodes. Each STP tube is associated with the corresponding cathode of the tube D1 by way of a saturable reactor such as SA2 controlling the potential applied to the cathode and having a control winding such as 2W1 in the anode circuit of the STP tube. Only one of these saturable reactors, of which there will be ten (that is, one per primary switch) is shown, the rest being similarly associated with the other cathodes of tube D1 and the corresponding STP tubes. Each fired STP tube produces at the corresponding cathode of tube D1 a negative potential tending to cause that cathode to take the discharge from the earthed auxiliary electrode *e*. Thus considering the tube 1STP, when this tube is fired it draws current through the control winding 2W1 of saturable reactor SA2, resulting in a flow of current through resistor *r*14 and the output winding 2W2 of this saturable reactor. In consequence of the voltage then appearing across resistor *r*14, a voltage doubler circuit comprising rectifiers R*f*14 and R*f*15 in conjunction with capacitors C2 and C3, produces across a resistor *r*15 a voltage which reduces the potential of the cathode 1 of the tube D1 to a value negative with respect to the potential of the auxiliary electrode *e*. In the same way any other cathode of the tube D1 which is associated with a fired STP tube is negatively marked. The glow discharge investing the auxiliary electrode *e*, thereupon transfers with increased intensity to one, and only one, of the marked cathodes, the resulting current flow through the anode resistor *r*16 of the tube D1 being effective to drop the anode voltage to a value ensuring "lock-out" of the other cathodes. In this way, one only of the marked X co-ordinates is selected, as is required. Assuming that the cathode 1 is thus invested with a discharge, the resulting current flow through the control winding 3W1 of a saturable reactor SA3 causes the output winding 3W2 of the latter to provide, through a voltage doubling rectifier circuit RF16 across a load resistor *r*17, a signal which fires a tube VT2. The resultant rise in potential at the cathode of this latter tube is applied over a lead O1 to be ultimately concerned in bringing about the energisation of the appropriate select magnet in the primary switch to which the selected marked X co-ordinate relates, that is, the select magnet which relates to the horizontal multiple having connected to it the link extending from that primary switch to the selected secondary switch. The output from tube VT2 is also applied over terminal GY as a gating signal to the GY terminal (GY1 . . . GY10) relating to this same primary switch in FIG. 4: that is, assuming cathode 1 of tube D1 relates to the X1 co-ordinate and thus switch P1, the terminal GY would be connected to the terminal GY1 in FIG. 4. A further tube VT3 is fired by the output from VT2 and marks each of ten terminals S1 . . . S10. Each of the other cathodes of tube D1 is similarly associated with a saturable reactor such as SA3 and tubes such as VT2 and VT3.

A marked X co-ordinate having thus been selected and a gating signal applied to a GY terminal, the Y co-ordinate marking existing at any B point (FIG. 4) associated with the selected primary switch is permitted to appear on the relevant Y co-ordinate wire. As there may be a calling subscriber on each of the groups in the selected primary switch, the number of Y co-ordinate wires thus marked may be anything up to ten. To select one of these marked co-ordinates a one-only selection circuit is employed such as that shown in FIG. 6, in which the circuitry for only two of the ten Y co-ordinates is shown in full, the rest being identical.

Figure 6:
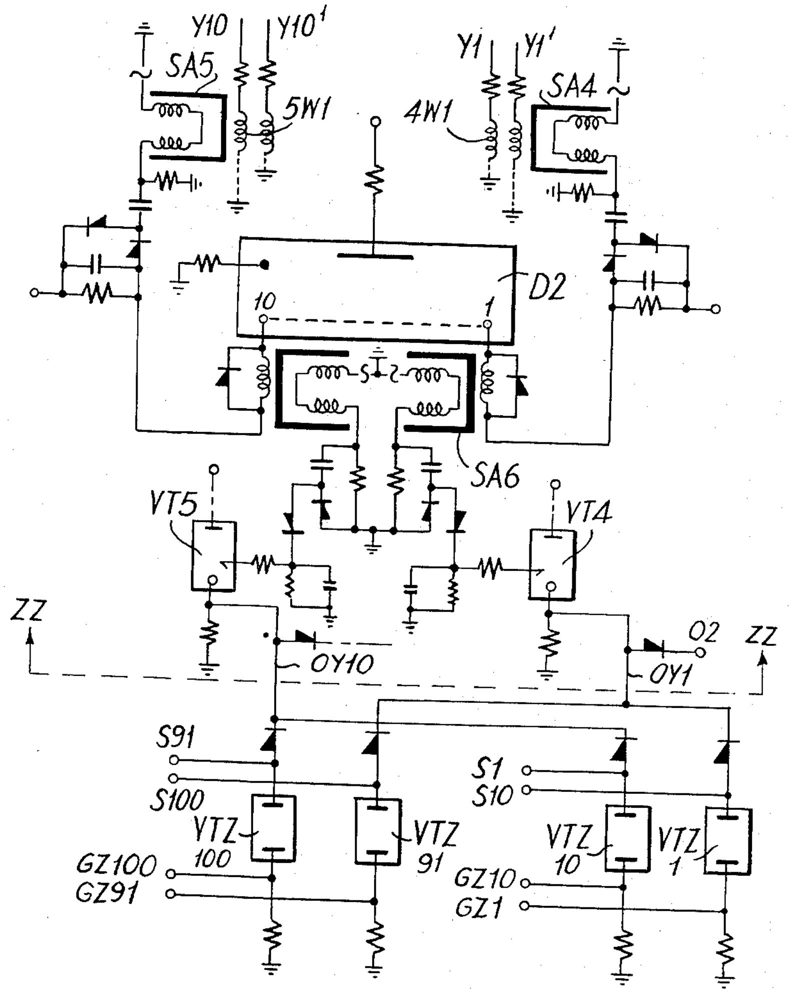
FIG. 6 is an abbreviated circuit diagram of a one-only selection circuit for selecting a marked Y co-ordinate, a similar circuit being used for selecting a marked Z co-ordinate.

Referring to FIG. 6, the Y co-ordinate wires Y1 . . . Y10 of FIG. 4 are connected to control windings such as 4W1 and 5W1 of saturable reactors such as SA4 and SA5 respectively associated with the cathodes of a multi-cathode tube D2 in exactly the same way as already described for the tube D1 in the X co-ordinate selection circuit of FIG. 5. With one or more of the Y co-ordinate wires marked and their markings effectively appearing at the corresponding cathodes of tube D2, this latter tube acts in the same way as the tube D1 to select one only of the marked Y co-ordinates. Assuming as a typical example that the Y1 co-ordinate is thus selected, the glow discharge in tube D2 will invest cathode number 1 and cause the saturable reactor SA6 to produce as before an output which will fire a tube VT4. This latter tube thereupon supplies over a lead O2 an output signal which will ultimately be used, in conjunction with a selected Z co-ordinate marking, in bringing about operation of the hold magnet pertaining to a particular vertical multiple in the group to which the selected Y co-ordinate relates.

A hundred cold-cathode diodes such as VTZ1, VTZ10, VTZ91 and VTZ100 have output terminals such as GZ1, GZ10, GZ91 and GZ100 which are connected respectively to the hundred terminals such as GZ in FIG. 4. These VTZ tubes are arranged in ten groups of ten of which the first group is represented by VTZ1 and VTZ10 and the last group by VTZ91 and VTZ100, each group relating to a different X co-ordinate. The output from each of the tubes such as VT4, in addition to being connected to a terminal such as O2, is also connected to a lead such as OY1 or OY10 and from there is connected in common to corresponding tubes taken from the several VTZ tube groups. For instance the output from tube VT4 for the Y1 co-ordinate is applied in common to the first VTZ tubes such as VTZ1 and VTZ91 in the several groups, while the output from the tube VT5, corresponding to VT4 for the Y10 co-ordinate, is applied in common at OY10 to the last VTZ tubes (e.g. VTZ10 and VTZ100) in the several groups. Also respectively connected to the VTZ tubes in each group are the ten terminals such as S1 . . . S10 which relate to the corresponding X coordinate in the X co-ordinate selection circuit (FIG. 5). Consequently when a marked X co-ordinate and a marked Y co-ordinate have been selected as described, one and one only of the VTZ tubes will be stimulated by outputs from both selection circuits together, with the result that only that tube will be fired. A gating signal is thereupon applied by the fired VTZ tube, by way of the associated GZ terminal in FIG. 6, to the terminal such as GZ in FIG. 4 which relates to the switch and group which these X and Y co-ordinates identify. The associated tube such as VT1 is thereupon fired and a marking at any of the ten A points which are associated with the selected group in the selected primary switch, is permitted to pass to the relevant Z co-ordinate wire as previously described.

Since any one or more of the subscribers connected to the selected group may be calling at the same time, up to ten Z co-ordinate wires may be marked in this way. Selection of one of them, and thus of one of these calling subscribers, is then effected by a one-only selection circuit identical in all respects with the circuit comprising the part of FIG. 6 above the horizontal dotted line ZZ, the selection resulting in the production of a signal at a terminal corresponding to one of the terminals such as O2. This latter signal is ultimately used in bringing about operation of the hold magnet which pertains to the vertical multiple to which the selected calling subscriber is connected.

Summarising with reference to FIG. 2 the action by which a particular calling subscriber is selected for attention to the temporary exclusion of other subscribers possibly calling on the same frame, the X co-ordinate one-only selector (FIG. 5) in the primary frame control circuit PF1C selects a primary switch P having a calling subscriber connected to it and having a free link such as *lk*1 extending from it to the secondary switch S already effectively selected, as previously described, by the register section control circuit RSC. This choice of a primary switch, recorded by the fired VT2 tube of FIG. 5, is equivalent to selecting and recording the identity of the marked X co-ordinate of that switch and brings about the opening of the gates for the Y co-ordinates relating to the ten groups of vertical multiples in the switch, thereby permitting markings to be applied to the Y co-ordinate wires pertinent to all calling subscribers connected thereto. The Y co-ordinate one-only selector in the control circuit PF1C then selects and records the identity of one marked Y co-ordinate wire and the choice together with the foregoing choice of X co-ordinate, brings about the opening of the gates for the Z co-ordinates relative to the ten vertical multiples in the group to which the selected X and Y co-ordinates together relate, this permitting markings to be applied to the Z co-ordinate wires which pertain to all calling subscribers connected to that group. The Z co-ordinate selector in the control circuit then selects and records the identity of one marked Z co-ordinate wire relating to a particular calling subscriber connected to the selected switch P. This completes the selection. The primary switch, group and vertical multiple to which the selected calling subscriber is connected in the primary frame are identified in the control circuit PF1C by the previously mentioned signals that are now present at the relevant O terminals of the one-only selection circuit. On the basis of the information afforded by these signals, the control circuit PF1C can then establish, by bringing about in any convenient manner the energisation of the appropriate select and hold magnets of the primary and secondary switches P and S concerned, a connection which extends from the subscriber's line (assumed to be LC1) through the primary frame by way of link *lk*1 and thence to the selected register RG by way of link *lk*2 and the register section RS, now also set by its control circuit RSC on the basis of the information stored by the latter. The auxiliary contacts *ph*1 and *ph*2 (FIG. 4), opened by the now-operated hold magnet for the vertical multiple to which the selected calling subscriber is connected, disconnect the subscriber's line from the co-ordinate signalling circuit. Other auxiliary contacts, *ph*3, likewise controlled by the hold magnet, serve when the hold magnet is operated (subscriber busy) to inhibit the marker from signalling a call to that subscriber. This will be further discussed hereinafter with reference to the corresponding auxiliary contacts *ph*3' associated with the called subscriber LC2 on frame PF2. The auxiliary contacts such as *rh*1 controlled by the hold magnets of the register section switches R serve, during the stage of a call when the selected register RG is in use, to disconnect from the trunk T2 leading to the incoming secondary frame ISF the selected link *lk*2 connected to the primary frame PF1 and connected through the latter to the calling subscriber LC1.

The particular calling subscriber thus connected to the register is selected from others at random by the action of the selection circuits for the X, Y and Z co-ordinates;

however, it does not matter which calling subscriber is selected since the time taken to deal with each can be very brief and they will all be dealt with ultimately.

The register RG reverts dialling tone to the calling subscriber LC1 thus connected to it and on receipt from the calling subscriber of the dialled digits signifying the called line, acquires the use of the marker M as soon as it becomes available and transfers to it the necessary information, whereupon the marker, by bringing about the marking of the appropriate X′, Y′ and Z′ co-ordinate wires, signals to the control circuit of the relevant primary frame the switch, group, and vertical multiple to which the called subscriber is connected in that frame, this signalling connection being indicated at *m2* in FIG. 2. Before considering the subsequent action in the exchange, the manner in which this co-ordinate signalling by the marker is preferably effected will be discussed.

Cross-bar exchange systems in general have an advantage over step-by-step systems in that they lend themselves more readily to expansion or reduction and can be capable of simple modification to up- or down-grade the service given. To obtain maximum flexibility the position (cross-bar vertical multiple) to which a subscriber's line is connected in any exchange should be completely divorced from the number allotted to the subscriber; that is, the positions of any two subscribers in the exchange should be interchangeable without requiring their numbers to be changed. This means, for instance, that subscribers having adjacent numbers such as 1023 and 1024 may be connected to different switches in different primary frames, while subscribers having widely different numbers such as 9999, 0101, 2679 may be connected to respective vertical multiples in one and the same cross-bar switch in a primary frame and even in the same group. Consequently a called subscriber's number cannot be used directly, as it could be in a step-by-step system, to control the setting up of a route through the exchange to that subscriber. Some form of translation by which a subscriber's number is related to the position which that subscriber may happen to occupy in the exchange has therefore to be provided for each of the assumed 10,000 subscribers. To this end it is arranged that, in response to the information received from the register regarding a called subscriber, the marker brings about the marking of the appropriate one of 10,000 points individual to the respective subscribers, this marking then being converted to a marking on the three X′, Y′ and Z′ co-ordinate wires relating to that subscriber and corresponding to the switch, group and vertical multiple to which it is connected in a particular primary frame: in other words, this conversion provides the required translation.

The marker must not bring about marking of these co-ordinate wires if the subscriber concerned is busy. The necessary inhibition can most easily be applied at the individual point marked by the marker and the previously mentioned auxiliary springset contacts such as *ph3*, provided on the hold magnet for the vertical multiple to which the subscriber is connected, is accordingly arranged when operated (subscriber busy) to produce an open circuit at this point.

Figure 7:
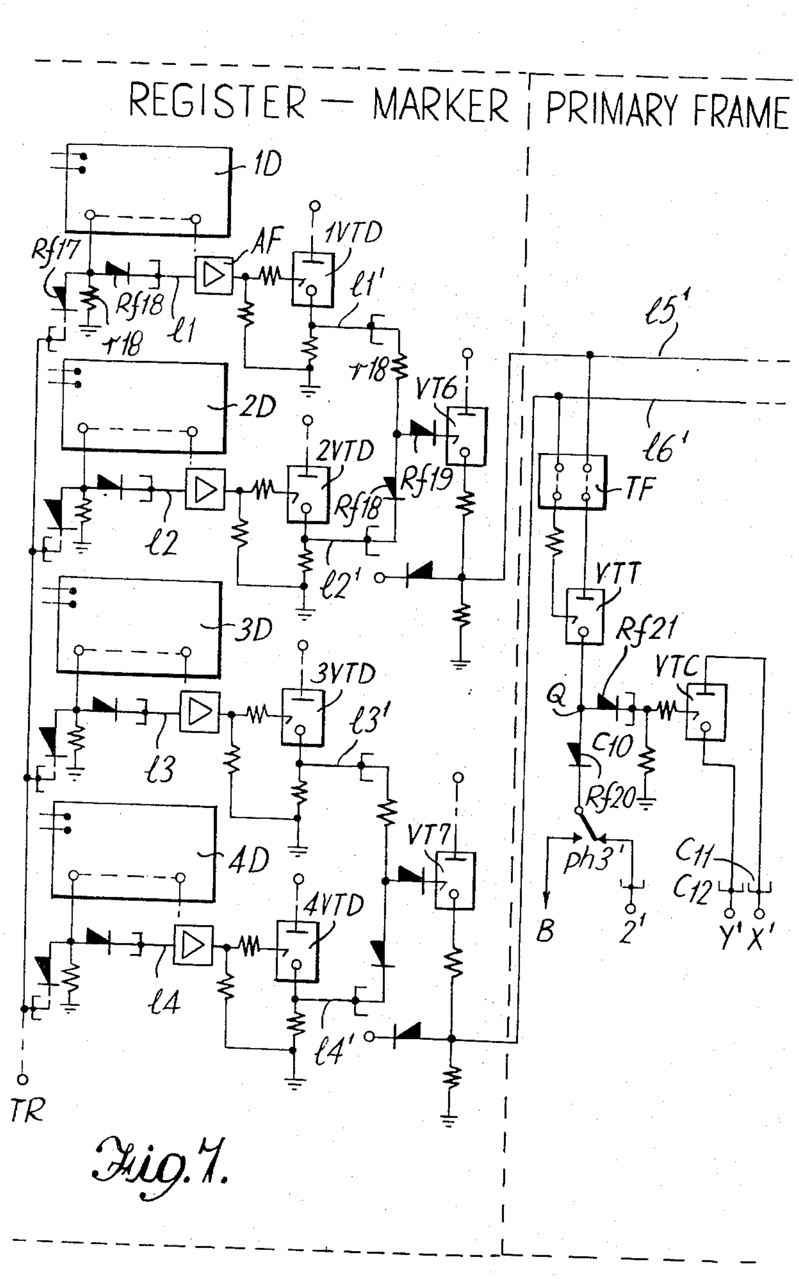
FIG. 7 illustrates the transmission of an outgoing marking signal from a common marker to a primary frame control circuit.

If these 10,000 individual points were located at the marker and the three-co-ordinate signalling was employed from there to the primary frame, then either the wiring from the auxiliary springsets, to these points, would have to be taken from the primary frame to the marker, or the co-ordinates would have to be recombined at the springsets and then converted to three-co-ordinates again. It is therefore preferred to have the individual points located at the primary frame and to employ a further co-ordinate signalling system between the marker and these points. This latter signalling system has to cater for 10,000 distinctive signals. This could be done, without redundancy, either by a four-co-ordinate system employing four sets of ten wires each ($10^4=10,000$) or by a two-co-ordinate system employing two sets of hundred wires each. Whereas the four-co-ordinate system requires fewer wires than the two-co-ordinate system, recombination of the co-ordinates to mark the individual points would require a greater amount of apparatus for each point (this difference accordingly being multiplied ten-thousand-fold) and would be likely to lead to other difficulties in connection with circuit design and fault sensitivity. Accordingly the two-co-ordinate system is preferred for this signalling and may be achieved as follows:

Referring to FIG. 7 and assuming that the called subscriber's number consists of four decimal digits, the selected register RG stores these digits, as received from the calling subscriber, in four Dekatron tubes 1D, 2D, 3D, 4D (one per decade) employed as digit stores in known manner. That is, a glow discharge in each tube will invest a particular cathode corresponding to the numerical value of the digit stored by the tube. Until such time as it is required to transfer the stored digit information to the marker M, all the cathodes of the Dekatrons are maintained at a low potential by virtue of their connection, through rectifiers such as R*f*17 to a terminal TR which is normally at earth or other low potential. When the register has obtained the services of the marker the potential of the terminal TR is raised positively to back off the rectifiers such as R*f*17, with the result that the registering cathode in each Dekatron, that is, the cathode invested with glow discharge, rises in potential due to the current flow through the associated cathode resistor such as *r*18. To each of the Dekatron cathodes is connected a lead such as *l*1 for the cathodes of Dekatron 1D, *l*2 for the Dekatron 2D, *l*3 for the Dekatron 3D and *l*4 for the Dekatron 4D, each of these leads *l*1, *l*2, *l*3 and *l*4 which are actually shown being therefore representative of a group of ten wires (one per cathode) relating to different values of the decimal digit stored by the associated Dekatron. The number of a called subscriber as registered by the Dekatrons is transmitted to the marker over these leads, as a four-co-ordinate signal the relevant lead in each group being marked as a result of the rise in potential of the associated cathode when invested with the glow discharge. Each of the leads such as *l*1, *l*2, *l*3 and *l*4 is connected from its associated cathode, over an isolating rectifier such as R*f*18, to an amplifier such as AF, this connection from each cathode being in common, as indicated at *cc*, with a similar connection from the corresponding cathode in the Dekatrons of each other register. This common connection is permissible since only one register is using the marker at any one time.

The outputs from each amplifier such as AF are applied to the control electrode of a cold-cathode tube such as 1VTD, 2VTD, 3VTD or 4VTD individual to the amplifier concerned, this tube being fired to raise its cathode potential when the potential of the associated Dekatron cathode in a register rises as just described. There are a total of forty VTD tubes but in FIG. 7 only one has been shown for each Dekatron in order not to unduly overburden the figure. Thus for Dekatron 1D the tube 1VTD is shown associated with the first cathode of the Dekatron and is representative of ten such tubes similarly associated with the respective cathodes of that Dekatron. Likewise the tubes 2VTD, 3VTD and 4VTD are each representative of ten such tubes similarly associated with the cathodes of the respective Dekatrons. The tubes such as 1VTD associated with Dekatron 1D have respective output connections of which *l*1′ is typical of a group of ten such connections corresponding to those typified by *l*1 and therefore relating to different values of the digit which that Dekatron stores. Likewise leads *l*2′, *l*3′ and *l*4′ are typical of respective groups of ten leads corresponding to those typified by *l*2, *l*3 and *l*4.

The four-co-ordinate signal consequently appearing on the connections *l*1 . . . *l*4 is converted in the marker to a two-co-ordinate one provided on two sets of a hundred wires each, only one wire from each set being shown as typical of the rest, namely *l5* typifying one set and *l6* typifying the other set. The conversion is effected by separately pairing each wire of the ten-wire groups typified by *l1* with each and every one of the wires of the ten-wire groups typified by *l2*, and by likewise pairing the wires of the remaining two ten-wire groups typified by *l3* and *l4*. It is immaterial which groups have their wires thus paired together. Each pair of wires, of which *l1* and *l2* are typical as are also *l3* and *l4*, are connected through a resistance-rectifier gate to the trigger electrode of an individual cold-cathode tube such as VT6 or VT7 which when fired provides a potential at its cathode which positively marks an output wire such as *l5* or *l6*. Each tube such as VT6 and VT7 and its associated circuitry preferably provides power amplification. As will be appreciated, there will be a hundred tubes such as VT6 or VT7 and a hundred output wires such as *l5* or *l6* associated with each two of the ten-wire groups, giving the required two sets of a hundred wires each for the two-co-ordinate signalling. For any particular called subscriber one wire from each of the four-wire sets typified by *l1*, *l2*, *l3* and *l4* will be marked by the register RG. The two gates to which these marked wires are connected as paired, each gate being constituted by a resistor and rectifiers such as *r*18, R*f*18 and R*f*19, open in response to the combined markings and the signals consequently passed by these gates fire the respective tubes such as VT5 and VT6 connected thereto. As a result one of the hundred wires typified by *l5* and one of the hundred typified by *l6* are marked in a two-co-ordinate combination unique to the particular subscriber called.

At each primary frame the wires from the two hundred-wire sets typified by *l5* and *l6* are cross-connected in pairs corresponding to the subscribers that are connected to that particular frame, the cross-connection being effected over a translation strapping field as indicated at TF in FIG. 7 for one subscriber. The wires of each pair are connected to the anode and trigger electrode respectively of a cross-connection cold-cathode tube such as VTT which is individual to the pair and thus to the subscriber to which the pair relates: each cross-connection tube such as VTT will therefore be fired when and only when both wires of the relevant pair are marked to indicate that the subscriber to which they relate is being called, this resulting in a point Q in the cathode circuit of the tube being accordingly marked. This point Q constitutes for the particular subscriber the individual translation point previously referred to.

Instead of the marker converting from the four- to a two-co-ordinate system by means of a rectifier-resistance gate provided for each two wires paired, the paired wires could be connected respectively to the anode and trigger electrode of an individual cold-cathode tube similarly to the mode of connection of the tube such as VTT. Likewise, resistance-rectifier gates could have been used instead of the cross-connection (translation) tubes VTT in translating from the two-co-ordinate system to the single marking of the individual Q points.

A marking at any translation point such as Q has now to be converted, in the relevant primary frame control circuit such as PF2C (FIG. 2), to markings on the X′, Y′ and Z′ co-ordinate wires relating to the called subscriber (LC2) concerned. This could be effected through isolating and gating circuits in a manner similar to that described in connection with the calling subscriber signalling (FIGS. 3 and 4), and it is contemplated that for P.B.X lines, for which a signal from the marker would be spread to cover all the lines of the P.B.X group, this mode of conversion would be used. However it is an important feature that for ordinary subscribers a simpler conversion and simpler subsequent operation of the exchange may be obtained based on the fact that the marker M only deals with one call at a time. This fact means that no gating is required for the Y′ and Z′ co-ordinates (as it was for the Y and Z co-ordinates for the calling subscriber signalling) in order to ensure that a related set of markings is taken. Furthermore, where the X′ co-ordinate marking is employed as an outgoing marking signal correspondingly to the use of the X co-ordinate marking as an incoming marking signal in the case of a calling subscriber, the terms incoming a ndoutgoing being used in relation to signals pertaining respectively to a calling subscriber and to the called subscriber, it is possible to pre-set those portions of relevant primary frame control circuit that respond to the Y′ and Z′ co-ordinates of a subscriber being called.

For converting a marking at any of the individual points such as Q into a three-co-ordinate marking, each such point is connected on the one hand through an isolating rectifier such as R*f*20 (FIG. 7) and over contacts such as *ph*3′ normal, to the Z′ co-ordinate wire pertaining to the Z′ co-ordinate of the called subscriber identified by a marking at the point concerned. On the other hand, each point such as Q is also connected, through an isolating rectifier such as R*f*21, to the trigger electrode of a tube such as VTC common (as indicated at *c*10) to all the other individual points, similar to Q, relating to subscribers connected to the same group of vertical multiples in the same primary switch. The anode of the tube VTC, commoned as indicated at *c*11 with the anodes of the corresponding tubes associated with the other groups in the same switch, is connected to the X′ co-ordinate wire for the X′ co-ordinate of that switch. Likewise the cathodes of the tube VTC, commoned as indicated at *c*12 to the cathodes of the corresponding tubes associated with the similarly positioned groups in the other primary switches, is connected to the Y′ co-ordinate wire for the Y′ co-ordinate allotted to these groups. The contact *ph*3′ in FIG. 7 which corresponds to the auxiliary contact bearing the same reference characters in FIG. 2, is operated from its normal condition (shown) to a reverse condition when, as has been explained, the subscriber to which the point Q relates is busy, this contact *ph*3′ being operated by the hold magnet for the cross-bar vertical multiple to which the subscriber concerned is connected in a primary switch of the primary frame.

Figure 8:
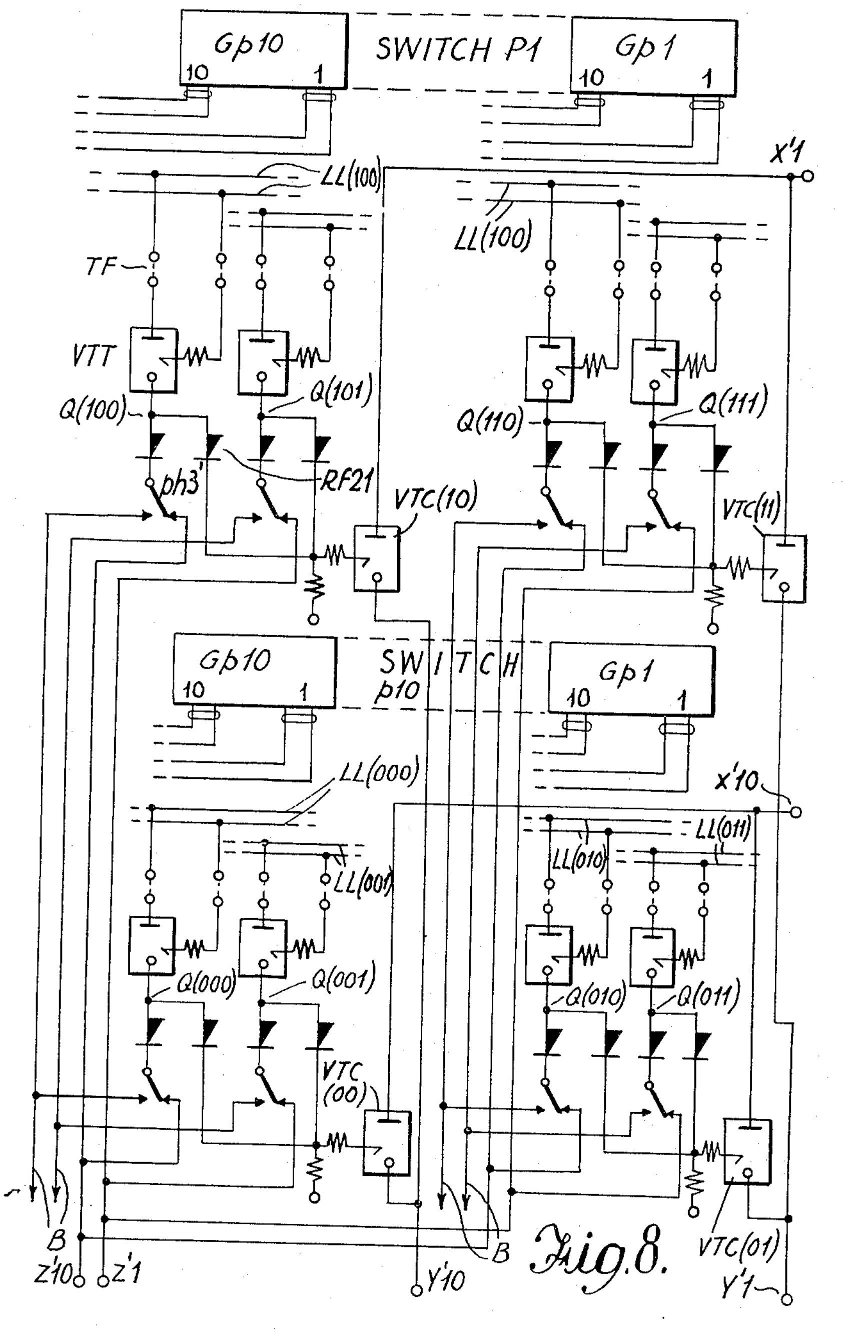
FIG. 8 illustrates more fully than FIG. 7 the circuit arrangements for obtaining three-co-ordinate marking at a primary frame.

The commoning of the X′, Y′ and Z′ co-ordinate wires is illustrated more fully in FIG. 8 in which marker signal translation and conversion circuitry, similar to that just described for a single subscriber, is shown for each of two subscribers connected to respective vertical multiples 1 and 10 in each of two groups G*p*1 and G*p*10 in each of two primary switches P1 and P10 in the same primary frame. For each subscriber there is a pair of signalling wires LL (such as LL(100)) which corresponds to the pair *l5*, *l6* in FIG. 7 and will be marked by the marker as a two-co-ordinate signal when the relevant subscriber is being called. The wires in each of the several pairs are cross-connected over a translation field by valves such as VTC as previously described, giving individual points. Translation to individual points Q(100), Q(101) . . . Q(010), Q(011), is effected by means of tubes such as VTT cross-connecting the wires as previously described over translation strapping fields such as TF. The Q points relating to subscribers connected to vertical multiples having the same positions in the several groups are commoned through the isolating rectifiers such as R*f*20 and the auxiliary contacts such as *ph*3′ in their normal positions to the appropriate Z′ co-ordinate wire: thus the points Q(100), Q(110), Q(000) and Q(010) are commoned at *z*10 in this way to the Z′10 co-ordinate wire, while the points Q(101), Q(111), Q(001) and Q(011) are likewise commoned at *z*1 to the Z′1 co-ordinate wire. The Q points relating to subscribers connected to vertical multiples in the same group are connected in common over rectifiers such as R*f*21 to the trigger electrode circuit of a cold-cathode tube such as VTC(10) for the points such as Q(100) and Q(101)

relating to subscribers connected to group Gp10 of switch P1, VTC(11) for the points such as Q(110) and Q(111) relating to group Gp1 of switch P1, VTC(00) for the points such as Q(000) and Q(001) relating to group Gp10 of switch P10, and VTC(01) for the points such as Q(010) and Q(011) relating to group Gp1 of switch P10. The anodes of the VTC tubes associated with the same switch are commoned to the relevant X' co-ordinate wire: for instance the tubes VTC(10) and VTC(11) associated with switch P1 have their anodes commoned to the X'1 co-ordinate wire while the tubes VTC(00) and VTC(01) associated with switch P10 have their anodes commoned to the X'10 co-ordinate wire. The cathodes of the VTC tubes relating to corresponding groups in the several switches are commoned to the relevant Y' co-ordinate wire: thus for instance the tubes VTC(10) and VTC(00) associated with group Gp10 in switches P1 and P10 respectively have their cathodes commoned to the Y'10 co-ordinate wire, while the tubes VTC(11) and VTC(01) have their cathodes commoned to the Y'1 co-ordinate wire.

Assume that a called subscriber (LC2 in FIG. 2) is connected in the frame PF2 to vertical multiple number ten in group Gp10 of switch P1. The marker will therefore mark the pair of signalling wires LL(100) to produce a corresponding marking at the point Q(100). If the called subscriber is busy the contact *ph*3' in its reverse position extends the marking over a lead B to a "busy" detector (not shown) which brings about at the register in use subsequent circuit operations appropriate to the detection of a busy line. If, however, the called subscriber is free, the marking at point Q(100) is extended over contacts *ph*3' normal and marks accordingly the relevant Z' co-ordinate wire Z'10. The marking at Q(100) also fires the tube VTC(10) resulting in the X'1 co-ordinate wire and the Y'10 co-ordinate wire being marked.

As has previously been indicated, the X' co-ordinate marking for a called subscriber is employed as an outgoing marking signal. This signal, which identifies the primary switch at which the call must terminate in the primary frame concerned, namely the primary switch to which the called subscriber is connected, is applied to indicate all the free links from that switch to the secondary side of the frame. To this end, referring to the upper part of FIG. 5 again, the X' co-ordinate marking is applied over a wire such as X' to excite the control winding W' of a saturable reactor such as SA', there being one such saturable reactor for each X' co-ordinate just as there is one saturable reactor such as SA for each X co-ordinate. The resulting output from the saturable reactor such as SA', applied across resistor *r*' and rectified in a voltage doubling circuit RF' as before, fires a tube MTP' individual to the X' co-ordinate concerned, there being a total of ten MTP' tubes of which only the one has been shown. There are also ten MTS' tubes, again of which only one has been shown, provided individually for the ten secondary switches and having their trigger electrodes cross-connected with the cathodes of the MTP' tubes over paths such as that formed by resistor *r*9' and rectifier R*f*8'. These paths, provided similarly to those between the MTP and MTS tubes and being a hundred in number, relate individually to the links such as *lk*3 in FIG. 2 extending between the primary and secondary switches of the frame concerned, the link *lk* in FIG. 5 being representative. If any particular link is busy an inhibiting condition is applied from its (earthed) P wire over connection *b* to the corresponding path such as *r*9', R*f*8', the action being the same as previously described in connection with the MTP and MTS tubes. Thus the firing of an MTP' tube relating to the primary switch to which a called subscriber is connected, will result in the firing of any MTS' tube relating to a secondary switch to which there is a free link from the primary switch concerned. One or more of the MTS' tubes having been fired in consequence of the existence of a free link such as *lk*3 in the primary frame PF2 (considering FIG. 2 again), the marking signal is extended from their cathodes over the control circuits OSFC, IFC and ISFC for the outgoing secondary, intermediate, and incoming secondary frames such as OSF, IF and ISF respectively, indicating in the process all the free trunks such as TS between these frames and the free links such as *lks* in them: in this way an outgoing marking signal is applied as indicated by the line *m*3 in FIG. 2 to indicate all available paths through the exchange to the called subscriber LC2. At the same time as this outgoing marking signal is being applied, the register RG selected for the call extends to the control circuit ISFC of the relevant incoming secondary frame such as ISF, via the register section concerned, an outgoing setting signal identifying which trunk (T2) was selected, in effect, between the register section RS and the incoming secondary frame ISF by the setting of the former in response to the setting signal initiated over connection *s*1 by the incoming marking signal from the calling subscriber LC1. This trunk T2 is the one which, on setting of the register section RS, was connected therethrough to the outgoing section T*o* of the trunk T from the register RG, the link *lk*2 being at the same time connected to the incoming section T*i* of the trunk T and being isolated from the trunk T2 by the contacts *rh*1 as previously indicated. Conveniently the outgoing setting signal from the register RG is extended to the incoming secondary frame over the (+) wire of the outgoing section T*o* of the trunk T and the (+) wire of the trunk T2, these wires being, of course, connected together through the register section switch R.

The control circuit ISFC at the incoming secondary frame ISF responds to the outgoing setting signal from the register RG to record the identity either of the inter-frame trunk T2 which it identifies or at least of the switch to which this trunk is connected in the incoming secondary frame; it also selects in the frame, and records the identity of, an appropriate link *lks* indicated as being free, and selects and records the identity of an appropriate outgoing trunk TS extending from that frame to an intermediate frame IF and indicated as being free. The control circuit ISFC then extends to the control circuit IFC of this latter frame IF a setting signal identifying the selected trunk TS, this extension of the setting signal being represented by the line *s*2. In the intermediate frame control circuit and subsequently in an outgoing secondary frame such as OSFC, a similar selecting and recording process takes place, this last control circuit OSFC finally selecting and recording a free trunk such as T1 extending from the outgoing secondary frame OSF to the primary frame PF2 to which the called subscriber LC2 is connected.

Since the selected trunk T1 extends to a particular secondary switch S in the primary frame PF2, the trunk selecting action of the outgoing secondary frame control circuit OSFC is equivalent to selecting and recording the identity of that particular secondary switch. It will be assumed as before that the identity of the secondary switch concerned is recorded by the firing of the relevant one of ten storage tubes provided individually in respect of the several secondary switches of the primary frame.

The control circuits for all the primary frames will be similar. Therefore the control circuit for frame PF2 will include the same one-only selection circuits as have already been described with reference to FIGS. 5 and 6 for the frame PF1 and these circuits are made use of, as will now be described in controlling the setting of the frame to establish connection to a called subscriber.

Referring to FIG. 5 again but assuming now that the circuits shown therein are those included in the control circuit PF2C for the primary frame PF2, the tubes 1STS' and 10STS' represent the ten storage tubes on which is recorded the secondary switch selected in effect by the outgoing secondary frame control circuit OSFC, only two of the tubes being shown to minimize complexity of the figure. One of these ten tubes will therefore be fired to indicate the particular secondary switch S selected. In the primary frame control circuit, ten tubes provided individually in respect of the ten primary switches in the frame are represented by 1STP′ and 10STP′. These STP′ tubes have their trigger electrodes cross-connected with the cathodes of all the STS′ tubes in the same way as already described for the STP and STS tubes, the cross-connections being by way of resistance-rectifier paths, such as *r*11′, R*f*10′ and *r*12′, R*f*11′, which are a hundred in number and correspond respectively to the links such as *lk* extending between the primary and secondary switches of the frame.

The firing of an STS′ tube to indicate a selected secondary switch results in its cathode potential being raised to mark the ten resistance-rectifier paths relating to the ten links which extend between that switch and the ten primary switches. In all but one of these paths the marking is inhibited by the action of a test lead such at *tl2* in detecting the unfired condition of the MTP′ tubes relating to the primary switches with which these paths are associated. However the test lead such as *tl2* for the path relating to the link between the selected secondary switch and the primary switch to which the called subscriber is connected, detects the fired condition of the MTP′ tube relating to that primary switch and provided that the link is still free permits the marking on that path to fire the STP′ tube relating to the primary switch concerned. As a result, current flows through a second control winding such as 2W3 on one of the saturable reactors such as SA2, causing this reactor to produce an output which in the same way as before lowers the potential of the associated cathode of the Dekatron tube D1. Since this cathode is the only one thus affected, it takes the glow discharge of the tube. As already described, the associated saturable reactor such as SA3 thereupon produces an output which fires a tube such as VT2, thereby recording the primary switch to which the called subscriber is connected (that is, the X′ co-ordinate of the called subscriber) and producing at a terminal such as O1 a signal which is ultimately used in setting the primary switch concerned. A tube such as VT3 will also be fired but the signals appearing at the terminals such as S1 and S10, and likewise the signal which appears at the terminal such as GY, are not used since as previously indicated the controls responding to the Y′ and Z′ co-ordinates are not gated but are pre-set during the transmission of the X′ co-ordinate as the outgoing marking signal and the consequent reversion of the setting signal.

For pre-setting the controls in response to the Y′ co-ordinate marking for a called subscriber, the Y′ co-ordinate wires (FIG. 8) are connected respectively to second control windings such as 4W3 and 5W3 of the saturable reactors such as SA4 and SA5 in the one-only selection circuit, similar to FIG. 6, included in the primary frame control circuit PF2C for Y co-ordinate selection for a calling subscriber. On receipt of a Y′ co-ordinate marking this circuit acts as previously described, except that since only one Y′ co-ordinate wire will be marked at a time there is no one-only selection action. Likewise the Z′ co-ordinate wires of FIG. 8 are connected to second control windings on the saturable reactors which are included in the one-only Z co-ordinate selection circuit (not shown) similar to the Y co-ordinate selection circuit of FIG. 6 as previously mentioned. Thus the Y′ and Z′ co-ordinate markings resulting from the operation of the marker result in signals being obtained at terminals such as O2 in the Y co-ordinate selection circuit and in the Z co-ordinate selection circuit, these signals being ultimately used for controlling the operation of the hold magnet relating to the vertical multiple identified by the Y′ and Z′ co-ordinates in the primary switch identified by the X′ co-ordinate. The pre-setting of the Y′ and Z′ stores, as constituted by the tubes such as VT4 and VT5 (FIG. 6) for the Y′ co-ordinates and by the corresponding tubes for the Z′ co-ordinates, leads to a useful reduction in the length of time for which the marker has to be kept in use for a call.

The control circuits at the several frames send "control-set" signals to the marker as soon as they have recorded their information, and the marker is released and becomes free for use on other calls once it has received the control-set signal from each control circuit and in response thereto has reverted to the control circuits a signal to which these circuits respond by energising, on the basis of their stored information the appropriate cross-bar select magnets and hold magnets for establishing through-connections in their respective frames. The reversion of this latter signal from the marker to the control circuits allows a faster release of the circuits if failure occurs in the setting sequence, since no magnets of the cross-bar switches will be operated until this signal is received by the control circuits.

In the foregoing description of the marker operation it has been assumed that, when the marker initially produced the co-ordinate signal identifying a called subscriber, the frame to which that subscriber is connected was not in process of being set for another call. To cater for the possibility of the frame being busy in this way—a condition which can readily be detected from its control circuit since it implies that the stores therein are in a set condition—provision can be made (not shown) whereby a "frame busy" signal is reverted to the marker in these circumstances and the marker is in consequence temporarily disconnected from the register concerned to render it available for use by other registers in the meantime.

Returning to FIG. 2, the outgoing trunk section T*o* from the selected register RG has now been connected through the relevant register section RS, the incoming secondary frame ISF and intermediate frame IF to the supervisory link circuit SC between this latter frame and the outgoing secondary frame OSF. The supervisory link circuit SC, which may take any suitable known form, then applies a holding earth to the P wires extended to it from the other frames by virtue of this connection, thereby enabling each frame control circuit to be freed for use on other calls as soon as it has carried out its setting function. The called subscriber LC2 is rung from the supervisory circuit, and the latter reverts to the register RG a signal to which the register responds by releasing itself from the connection. It also releases the register section RS so that the connection extended to the calling subscriber through the primary and secondary switches of the primary frame PF1 thereupon becomes connected through the restored contacts such as *rh*1 and trunk T2 to the incoming secondary frame ISF and thence through the intermediate frame IF, the supervisory circuit SC and the outgoing secondary frame OSF to the trunk T1 connected to the called subscriber through the primary frame PF2. The supervisory circuit thereafter effects the control and supervision of the call.

In the foregoing, the manner in which the setting signals are transmitted from an incoming secondary stage to the intermediate stage and from there to the outgoing secondary stage has not been dealt with in any detail. Each of these switching stages consists of several frames of which only one has been represented in FIG. 2, the actual number depending on the exchange capacity required. Each frame is assumed to have ten inter-linked primary and ten secondary switches giving access between a hundred inter-stage trunks on one side and a hundred on the other. The size of each frame may be considered as fixed; the capacity of the exchange may be varied by varying the number of frames per stage. The number of inter-frame trunks between successive stages will thus be a hundred times the number of frames per stage and since the setting signal has to identify one of these trunks it is contemplated that a three-co-ordinate signalling system could here be used with advantage, employing two groups of ten wires each and a further group of $n$ wires, where $n$ is the number of frames per stage and $$10\times10\times n$$

is therefore the number of inter-stage trunks.

Considering the frames constituting any particular switching stage, the control circuit for one of these frames will in response to a received setting signal select and record inter alia a particular inter-frame trunk to the following stage in the direction of transmission of the setting signal. The information stored must therefore indicate, or can readily be re-arranged to indicate, the particular frame, switch, and vertical multiple in that switch to which the selected trunk is connected. Any particular inter-stage trunk can therefore be identified by markings on the appropriate one of $n$ signal wires relating to the respective frames in the stage considered; on the appropriate one of ten wires relating respectively to the ten switches in any frame of that stage; and on the appropriate one of ten wires relating respectively to the ten vertical multiples in any of these switches, thus providing a three-co-ordinate signal which can be transmitted to the following stage as the setting signal.

Figure 9:
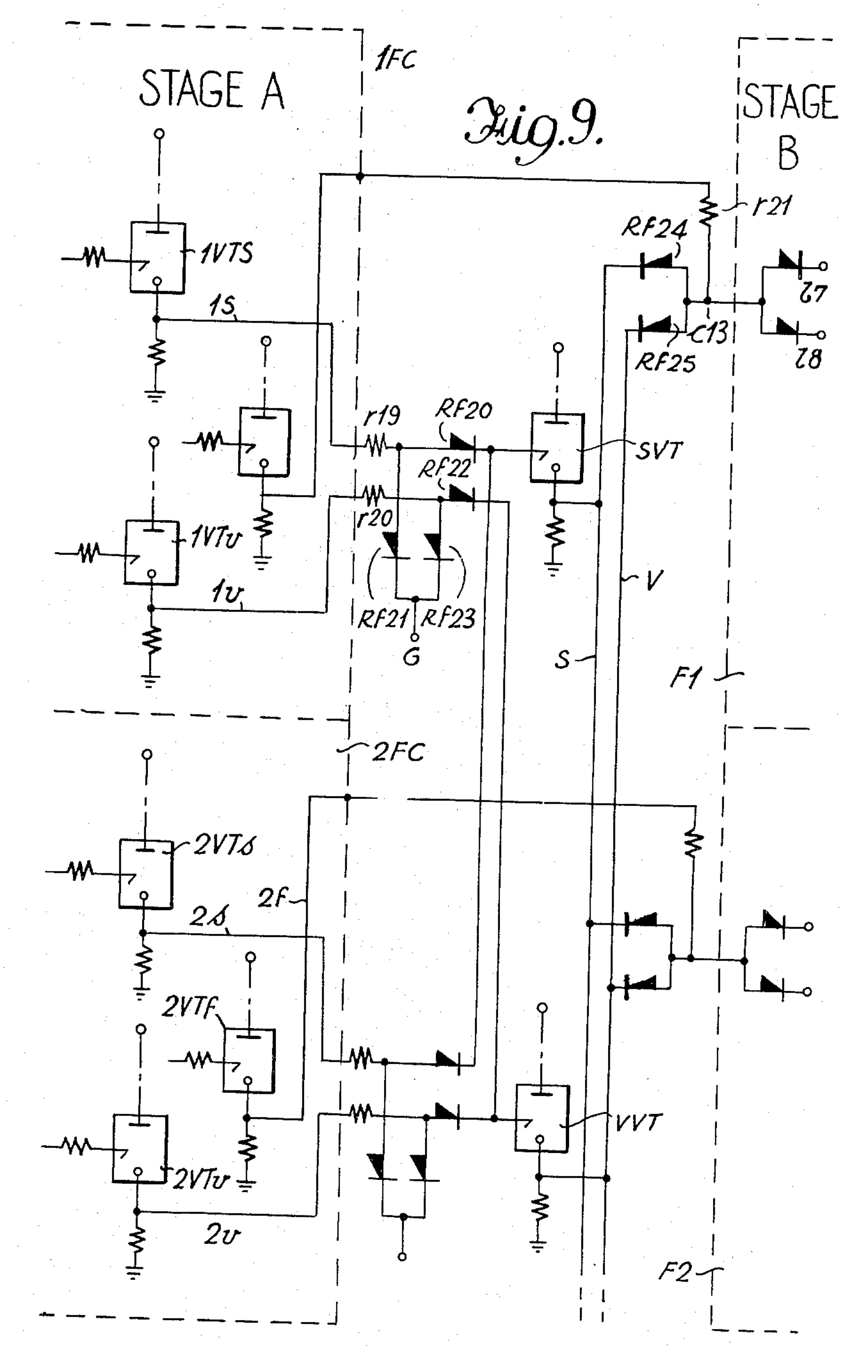
FIG. 9 is an abbreviated circuit diagram illustrating a mode of transmitting a setting signal from one switching stage to another on a co-ordinate basis.

This is illustrated in FIG. 9 for a switching stage A of $n$ frames which has to transmit on a three-co-ordinate basis a setting signal conveying the necessary information to another switching stage B two frames of which are represented by the dotted rectangles F1 and F2. At the left-hand side of FIG. 9 parts of the control circuits 1FC and 2FC for two frames of stage A are shown, any other frames in this stage having similar control circuits. Each frame control circuit includes: a group of $n$ storage tubes one of which is represented at 1VT*f* for circuit 1FC and at 2VT*f* for circuit 2FC, these $n$ tubes in each control circuit relating respectively to the $n$ frames in stage A; a group of ten storage tubes relating respectively to the ten switches in any frame in stage A, one of these ten tubes being represented at 1VT*s* for frame control circuit 1FC and at 2VT*s* for frame control circuit 2FC; and another group of ten tubes relating respectively to the ten vertical multiples in any switch in any frame of stage A, one of these last ten tubes being represented at 1VT*v* and 2VT*v* for the circuits 1FC and 2FC respectively.

After the control circuit such as 1FC or 2FC for one of the frames in stage A has selected a trunk leading to a frame in stage B, the frame, switch and vertical multiple to which that trunk is connected in stage A is recorded there by the firing of the corresponding ones of the VT*f*, VT*s* and VT*v* tubes in the frame control circuit concerned. The cathode potentials of the fired tubes are therefore raised to mark respective wires such as 1*f*, 1*s* and 1*v* or 2*f*, 2*s* and 2*v* connected to them, each of the *s* and *v* wires being one of a group of ten (the others not being shown) similarly associated with the remaining VT*s* or VT*v* tubes as the case may be. There is thus produced by the marking of one of the *f* wires, one of the *s* wires and one of the *v* wires a three-co-ordinate signal identifying the selected trunk extending between stage A and stage B. These markings are transferred to corresponding co-ordinate wires such as F, S and V, the wire F being one of $n$ wires pertaining to different frames in stage A and the wires S and V each being one of ten wires pertaining to different switches and different vertical multiples respectively in stage A.

To ensure unambiguous signalling only one setting signal should be present on the co-ordinate wires such as F, S and V at any time: thus once a particular combination of three co-ordinate wires, relating respectively to frame, switch and vertical multiple, has been marked to provide a setting signal, further marking should be inhibited at the frame from which the signal was transmitted. The frame (F) co-ordinates, being individual to the respective frames, can be readily inhibited in any convenient manner. For the switch and vertical multiple co-ordinates corresponding wires from the *s* and *v* sets in the various frame control circuits of stage A (namely *s* wires relating to the same S co-ordinate and likewise *v* wires relating to the same V co-ordinate) are connected through respective inhibition gates to a common point such as *c*13 or *c*14 connected to the control electrode of an amplifier tube individual to the common co-ordinate concerned. Thus for each S co-ordinate there is a tube such as SVT and for each V-co-ordinate a tube such as VVT, making a total of ten tubes such as SVT and ten such as VVT. A marking on an *s* wire at frame A consequent on firing of a VT*s* tube results, in the absence of an inhibition applied to the corresponding gate as will be described, in firing the corresponding SVT tube thereby to mark the S wire connected at its cathode. Likewise a marking on a *v* wire at frame A normally results in firing the corresponding VVT tube to mark the V wire connected to its cathode.

Each of the inhibition gates just referred to is constituted by a resistance-rectifier combination such as *r*19, R*f*20 and R*f*21 for wire 1*s*, and *r*20, R*f*22 and R*f*23 for wire 1*v*. Normally the terminals such as G are either open-circuited or held sufficiently positive to back off the rectifiers such as R*f*21 and R*f*23. When, however, a frame has transmitted a setting signal, an SVT and a VVT tube having been fired from that frame, it applies an earth to the relevant terminal such as G so that any marking thereafter applied to the relevant *s* or *v* wire by the frame control circuit is diverted to earth and transmission of such marking is thereby inhibited.

At stage B it is necessary to obtain from the three-co-ordinate setting signal on the F, S and V wires, information as to which switch in the stage and which vertical multiple of that switch has the selected trunk connected to it. In other words the three-co-ordinate setting signal has to be converted to a two-co-ordinate one. This may be done, for each distinctive combination of an F, S and V wire by means of a resistance-rectifier gate in which one of the co-ordinate wires of such combination, preferably the frame co-ordinate (F) wire as shown, is connected through a resistance such as *r*21 to a common point such as *c*13 while the other co-ordinate wires (S and V) are connected to this common point through respective rectifiers such as R*f*24 and R*f*25. Each common point such as *c*15 has branching from it two leads such as *l*7 and *l*8 each including a series rectifier, one of these leads being one of a group of 10*x* such leads relating to respective switches in stage B and the other being one of ten leads relating to respective vertical multiples of these switches. Thus on receipt of a three-co-ordinate setting signal at stage B two leads such as *l*7 and *l*8 are marked at one of the receiving frames to indicate to which switch in that frame and to which vertical multiple in that switch the inter-frame trunk selected at the preceding frame is connected. These markings are recorded, as on cold-cathode storage tubes (not shown), by the control circuit for the frame concerned, which circuit, in accordance with the information thus stored and after selecting a particular link in its frame by the selection and operation of a particular select magnet in the switch concerned, brings about operation of the hold magnet for the vertical multiple to which the trunk is connected.

Instead of transmitting the setting signal on a three-co-ordinate system and converting it to two as just described, the setting signal in that way identifying a particular inter-frame trunk, a somewhat simpler mode of transmission may be employed if the signal is made to identify the particular switch to which the trunk is connected in the frame receiving the signal. This alternative mode forms the subject of our U.S. Patent 2,925,474, to which reference for a description thereof should be had, this latter application also disclosing a modified form of selection and control circuit which can then be employed for the switching frames other than the primary frames.

What I claim is:

1. A selective switching system including, a switching frame having a primary side and a secondary side, connections terminating at the primary side and at the secondary side of the frame, a frame control circuit for controlling selective operation of the frame to establish access therethrough between an identified primary-side connection and a selected secondary-side connection, a further control circuit operable to control the effective selection of such secondary-side connection, and a co-ordinate marking arrangement which comprises N groups of signal wires containing $M_1$, $M_2$ . . . $M_N$ wires respectively, where N equals at least two and $$M_1 \times M_2 \times \ldots M_N$$

is at least equal to the total number of primary-side connections, and by which can be signalled to the frame control circuit, as a combination of co-ordinate markings on a unique and individual combination of N signal wires taken one from each of said N groups, the identity of a particular primary-side connection in respect of which access through the frame is required, the frame control circuit being operable in response to a received combination of co-ordinate markings to extend an initiating signal condition to said further control circuit, and said further control circuit being operable in response to said initiating signal to initiate the effective selection of a particular free secondary-side connection and to revert to the frame control circuit a setting signal by which that connection is identified, the frame control circuit responding to said setting signal to control the establishment through the frame of a connection between the identified primary-side connection and the selected secondary-side connection.

2. A selective switching system as claimed in claim 1, wherein said switching frame comprises a plurality of selecting switches each having a plurality of said primary-side connections terminating thereat which are effectively divided into groups, and wherein for signalling to said frame control circuit the identity of such a connection in respect of which access through the frame is required, there is provided in said co-ordinate signalling arrangement a first group of signal wires corresponding in number to the number of switches in said plurality thereof, a second group of signal wires corresponding in number to the greatest number of connection groups connected to a switch, and a third group of signal wires corresponding in number to the greatest number of connections in a group thereof, together with means effective in accordance with a primary-side connection to be identified to mark in said groups of signal wires those wires respectively corresponding therein to the switch to which that connection is connected, to the group in which that connection is included, and to the position of the connection in its group, thereby fully and uniquely to identify the primary-side connection by the combination of wires thus marked.

3. A selective switching system including, a switching frame having a primary side and a secondary side, subscribers' or other stations connected to the primary side of the frame and connections terminating at the secondary side of the frame, a frame control circuit for controlling selective operation of the frame to establish access therethrough between an identified calling station and a selected secondary-side connection, a plurality of registers selectively connectible to said secondary-side connections, a register selection circuit operable to select a free register from said plurality and to control, on the one hand, the effective selection of such secondary-side connection and, on the other hand, the connection of that secondary-side connection to the selected register, and a co-ordinate marking arrangement which comprises N groups of signal wires containing $M_1$, $M_2$ . . . $M_N$ wires respectively, where N equals at least two and $$M_1 \times M_2 \times \ldots M_N$$

is at least equal to the total number of said stations, and by which can be signalled to the frame control circuit, as a combination of co-ordinate markings on a unique and individual combination of N signal wires taken one from each of said N groups, the identity of a particular calling station in respect of which access through the frame is required, the frame control circuit being operable in response to a received combination of co-ordinate markings to extend an initiating signal condition to said register selection circuit, and said register selection circuit being operable in response to said initiating signal, to select a free register to initiate the effective selection of a particular free secondary-side connection, and to revert to the frame control circuit a setting signal by which that connection is identified, the frame control circuit responding to said setting signal to control the connection of the selected secondary-side connection to the selected register and to control the establishment through the frame of a connection between the calling station and the selected secondary-side connection.

4. A selective switching system as claimed in claim 3, wherein said co-ordinate marking arrangement includes a plurality of marking points respectively individual to said stations, and wherein there are effective connections between each such point and the N co-ordinate wires constituting the combination allocated to the station to which the point relates, and means responsive to initiation of a calling condition by a calling station for marking the relevant individual point, said connections including one-way isolating devices and permitting a marking at any individual point to be applied to the relevant N co-ordinate wires.

5. A selective switching system as claimed in claim 3, wherein said switching frame comprises a plurality of selecting switches each having connected thereto a plurality of the said stations effectively divided into groups, and wherein for signalling the identity of a calling station to said frame control circuit there is provided in said co-ordinate marking arrangement a marking point individual to each station, a first group of signal wires corresponding in number to the number of switches in said plurality thereof, a second group of signal wires corresponding in number to the greatest number of station groups connected to a switch, a third group of signal wires corresponding in number to the greatest number of stations in a group, and effective connections, including one-way isolating devices, extending between each individual marking point and those signal wires, one in each group thereof, which respectively correspond to the switch to which the station denoted by the point is connected, to the station group in which that station is included, and to the position of the station in its group, together with means responsive to a calling condition of a calling station for marking the relevant individual point, said connections permitting such marking at an individual point to be extended to the combination of signal wires effectively connected thereto by the connections.

6. A selective switching system as claimed in claim 5, wherein said co-ordinate mraking arrangement includes gating means in the connections between each said individual point and the related co-ordinate signal wires in the groups thereof respectively relating to the station groups and to the station positions in their groups, and wherein the said frame includes a plurality of interconnecting paths extending through it between its primary and secondary sides and the said frame control circuit includes means by which the marking appearing on a co-ordinate signal wire relating to a switch to which a calling station is connected is extended to mark all available paths through the frame in respect of that switch, means responsive to a reverted setting signal for selecting a marked available path between a secondary-side connection identified by that signal and a switch to which a calling station is connected, means responsive to such selection for gating to the co-ordinate signal wires relating to the station groups, the marking present at the individual point relating to any calling station connected to the last-mentioned switch, means for selecting a co-ordinate wire marked by this latter gating action, which wire thus relates to a station group connected to the last-mentioned switch, means responsive to these two selections for gating the co-ordinate signal wires relating to respective station positions in their groups, the marking present at the individual point relating to any calling station included in the last-mentioned station group, means for selecting a co-ordinate wire marked by this latter gating action, which wire thus relates to a particular calling station connected to the last-mentioned switch, and means responsive to the several selections for establishing through said switch a connection between said particular calling station and the selected available path.

7. A selective switching system having first and second switching stages and including in said first switching stage, a switching frame having a primary side and a secondary side, subscribers' or other stations connected to the primary side of the frame and connections extending from said second switching stage terminating at the secondary side of the frame, a frame control circuit for controlling selective operation of the switches of the frame to establish access therethrough between an identified called station and a selected secondary-side connection extending between said first and second stages, a further control circuit associated with said second stage and operable to control the effective selection of such connection between the stages, and a co-ordinate marking arrangement which comprises N groups of signal wires containing $M_1$, $M_2$ . . . $M_N$ wires respectively, where N equals at least two and $M_1 \times M_2 \times \ldots M_N$ is at least equal to the total number of stations, and by which can be signalled to the frame control circuit, as a combination of co-ordinate markings on a unique and individual combination of N signal wires taken one from each of said N groups, the identity of a particular called station in respect of which access through the frame is required, the frame control circuit being operable in response to a received combination of co-ordinate markings to extend an initiating signal condition to said further control circuit, and said further control circuit being operable in response to said initiating signal to subsequently initiate the effective selection of a particular free connection between the stages and to revert to the frame control circuit of the first stage a setting signal by which that connection is identified, this frame control circuit responding to said setting signal to control the establishment through the frame of a connection between the called station and the selected connection between said stages.

8. A selective switching system as claimed in claim 7, wherein said switching frame comprises a plurality of selecting switches each having connected thereto a plurality of the said stations effectively divided into groups, and wherein for signalling the identity of a called station to said frame control circuit there is provided in said co-ordinate marking arrangement a first group of signal wires corresponding in number to the number of switches in said plurality thereof, a second group of signal wires corresponding in number to the greatest number of station groups connected to a switch and a third group of signal wires corresponding in number to the greatest number of stations in a group, the switching system also including a marker effective in response to receipt of information as to the identity of a called station, to mark in said groups of signal wires those wires respectively corresponding therein to the switch to which the called station is connected, to the group in which the station is included, and to the position of the station in its group, thereby to fully and uniquely identify the station by the combination of wires thus marked.

9. A selective switching system as claimed in claim 8, wherein the said frame includes a plurality of interconnecting paths extending through it between its primary and secondary sides and the said frame control circuit includes means by which the marking applied to the co-ordinate signal wire relating to the switch to which a called station is connected, is extended to mark all of said paths which are available and which have access through that switch to the called station, together with means responsive jointly to a reverted setting signal effectively identifying a particular available path having such access and to the markings applied by the marker to the co-ordinate setting wires relating respectively to the station group of the called station and to its position in the groups, for establishing a connection through said switch between the called subscriber and that particular path.

10. A selective switching system as claimed in claim 1, comprising a first switching stage including a plurality of frames each including a plurality of switches, a second switching stage, inter-stage trunks a plurality of which are connected to each switch in the first stage, control means at the first stage for selecting particular inter-stage trunks and a further co-ordinate marking arrangement for identifying to the second stage a particular trunk selected at the first stage, which further co-ordinate arrangement comprises a first group of signal wires corresponding in number to the number of frames in the first stage, a second group of signal wires corresponding in number to the greatest number of switches in any one of said frames, and a third group of signal wires corresponding in number to the greatest number of trunks connected to any one of said switches in the first stage, together with means at the first stage responsive to the selection of a particular trunk to mark in said groups of signal wires those wires respectively relating therein to the frame to which the selected trunk is connected in the first stage, to the switch to which the trunk is connected in that frame, and to the position which the trunk occupies in the plurality thereof connected to that switch, the combined markings on those wires thereby fully identifying the trunk selected.

References Cited in the file of this patent

UNITED STATES PATENTS

| | | |
|---|---|---|
| 2,238,223 | Kozma | Apr. 15, 1941 |
| 2,600,502 | Holden | June 17, 1952 |
| 2,603,716 | Low | July 15, 1952 |
| 2,695,928 | Joel | Nov. 30, 1954 |